US012405001B2

(12) United States Patent
Kawauchi et al.

(10) Patent No.: US 12,405,001 B2
(45) Date of Patent: Sep. 2, 2025

(54) COMBUSTOR

(71) Applicants: KABUSHIKI KAISHA TOYOTA JIDOSHOKKI, Kariya (JP); OSAKA UNIVERSITY, Suita (JP)

(72) Inventors: Hiroyasu Kawauchi, Kariya (JP); Hideaki Suzuki, Kariya (JP); Yoshitaka Takeuchi, Kariya (JP); Ryuichi Murai, Suita (JP); Fumiteru Akamatsu, Suita (JP); Yu Imahashi, Suita (JP)

(73) Assignees: KABUSHIKI KAISHA TOYOTA JIDOSHOKKI, Kariya (JP); OSAKA UNIVERSITY, Suita (JP)

( * ) Notice: Subject to any disclaimer, the term of this patent is extended or adjusted under 35 U.S.C. 154(b) by 535 days.

(21) Appl. No.: 17/794,650

(22) PCT Filed: Jan. 13, 2021

(86) PCT No.: PCT/JP2021/000841
§ 371 (c)(1),
(2) Date: Jul. 22, 2022

(87) PCT Pub. No.: WO2021/157302
PCT Pub. Date: Aug. 12, 2021

(65) Prior Publication Data

US 2023/0086672 A1 Mar. 23, 2023

(30) Foreign Application Priority Data

Feb. 5, 2020 (JP) ................................ 2020-018145
Sep. 30, 2020 (JP) ................................ 2020-165666

(51) Int. Cl.
*F23D 14/02* (2006.01)
*F23D 14/24* (2006.01)
(Continued)

(52) U.S. Cl.
CPC ............ *F23D 14/02* (2013.01); *F23D 14/24* (2013.01); *F23Q 3/00* (2013.01); *H01T 13/32* (2013.01)

(58) Field of Classification Search
CPC . F23D 14/02; F23D 14/24; F23Q 3/00; H01T 13/32
(Continued)

(56) References Cited

U.S. PATENT DOCUMENTS 4,695,758 A 9/1987 Nishida et al.
5,821,675 A 10/1998 Suzuki
(Continued)

FOREIGN PATENT DOCUMENTS

CN 1369124 A 9/2002
JP 51-9134 U 1/1976
(Continued)

OTHER PUBLICATIONS 1992-12-04.*
(Continued)

*Primary Examiner* — Avinash A Savani
(74) *Attorney, Agent, or Firm* — Sughrue Mion, PLLC

(57) ABSTRACT

A combustor includes: a housing having an annular shape of which one end side is open and of which the other end side is closed; at least one introduction portion that introduces a fuel and an oxidizing gas into the housing to generate a tubular flow; and an ignition unit that ignites the fuel introduced into the housing. The ignition unit includes a discharge electrode and a ground electrode. A space that the fuel and the oxidizing gas reach is provided between the discharge electrode and the ground electrode.

12 Claims, 21 Drawing Sheets

(51) Int. Cl.
*F23Q 3/00* (2006.01)
*H01T 13/32* (2006.01)

(58) Field of Classification Search
USPC .......................................................... 431/354
See application file for complete search history.

(56) References Cited

U.S. PATENT DOCUMENTS

| | | | | |
|---|---|---|---|---|
| 6,048,196 | A * | 4/2000 | Collier .................... | F23Q 3/008<br>313/139 |
| 6,080,029 | A | 6/2000 | Johnson et al. | |
| 2005/0106517 | A1 | 5/2005 | Okada et al. | |
| 2010/0099052 | A1 | 4/2010 | Okada et al. | |
| 2010/0104991 | A1 | 4/2010 | Okada et al. | |

FOREIGN PATENT DOCUMENTS

| | | | |
|---|---|---|---|
| JP | 61-32979 | A | 2/1986 |
| JP | 63-184372 | U | 11/1988 |
| JP | H04350402 | A * | 12/1992 |
| JP | 7-288170 | A | 10/1995 |
| JP | 2004-93114 | A | 3/2004 |
| KR | 10-1174094 | B1 | 8/2012 |
| WO | 2004/025179 | A1 | 3/2004 |

OTHER PUBLICATIONS

Australian Office Action dated Sep. 4, 2023 in Australian Application No. 2021217837.
International Preliminary Report on Patentability with translation of Written Opinion issued Jul. 28, 2022 in International Application No. PCT/JP2021/000841.

* cited by examiner

COMBUSTOR

CROSS REFERENCE TO RELATED APPLICATIONS

This application is a National Stage of International Application No. PCT/JP2021/000841, filed Jan. 13, 2021, claiming priorities to Japanese Patent Application No. 2020-018145, filed Feb. 5, 2020 and Japanese Patent Application No. 2020-165666, filed Sep. 30, 2020.

TECHNICAL FIELD

The present disclosure relates to a combustor.

BACKGROUND ART

As a combustor of the related art, for example, a technique disclosed in Patent Literature 1 has been known. The combustor disclosed in Patent Literature 1 includes a combustion chamber having a tubular shape in which a tip is open and serves as a discharge port for combustion exhaust gas, a plurality of nozzles attached to the vicinity of a rear end of the combustion chamber to inject a fuel gas and an oxygen-containing gas into the combustion chamber, and an ignition spark plug that is attached to the rear end of the combustion chamber and that is caused to fire a spark in the combustion chamber by an igniter and a power source. The nozzles are provided to inject the fuel gas and the oxygen-containing gas in a tangential direction of an inner peripheral surface of the combustion chamber. The ignition spark plug is disposed between a tube axis of the combustion chamber and a position of r/2 (r: radius of the combustion chamber).

CITATION LIST

Patent Literature

Patent Literature 1: Japanese Unexamined Patent Publication No. 2004-93114

SUMMARY OF INVENTION

Technical Problem

However, in the technique of the related art, a mixed gas of the fuel gas and the oxygen-containing gas is ignited only in the vicinity of a radially center portion of the combustion chamber having a tubular shape. Therefore, it is necessary to locally adjust the flow speed and the air-fuel ratio of the fuel gas and the oxygen-containing gas according to the ignition position, and it is difficult to secure the ignition stability of the fuel gas. The ignition stability referred to here means reliably performing ignition within a desired time.

An object of the present disclosure is to provide a combustor capable of improving the ignition stability of a fuel.

Solution to Problem

A combustor according to one aspect of the present disclosure includes: a housing having a circular tubular shape in which one end forms an open end that is open, and in which a closed wall is provided at the other end; at least one introduction portion that introduces a fuel and an oxidizing gas into the housing to generate a tubular flow; and an ignition unit that ignites the fuel introduced into the housing. The housing is grounded to function as a ground electrode. The ignition unit includes a discharge electrode terminal disposed in a region including an inside on a closed wall side of the housing, to function as a discharge electrode, and a voltage supply unit that supplies a voltage to the discharge electrode terminal, and generates a discharge between a tip portion of the discharge electrode terminal and the housing to ignite the fuel.

In such a combustor, when the introduction portion introduces the fuel and the oxidizing gas into the housing having a circular tubular shape to generate a tubular flow, the fuel and the oxidizing gas form a tubular flow and flow inside the housing in a swirling manner. At this time, the fuel and the oxidizing gas flowing toward the closed wall of the housing hit the closed wall and flow while changing the direction. In that state, when the voltage supply unit supplies a voltage to the discharge electrode terminal, a discharge is generated between the tip portion of the discharge electrode terminal and the grounded housing, so that the fuel is ignited and combusted to generate combustion gas including a tubular flame. Then, the combustion gas flows inside the housing toward the open end of the housing and is discharged from the open end. Here, the discharge is generated in a wide range between the tip portion of the discharge electrode terminal and the housing. In addition, since the closed wall side of the housing is used as the ground electrode, the electrode area is substantially increased. In addition, a dielectric breakdown is directed from the discharge electrode terminal toward the housing, and discharge paths are radially formed at 360 degrees. Therefore, the structure is unlikely to be affected by a local fluctuation in gas flow and a local surface condition of the housing, and the ignition stability of the fuel is improved. In addition, the discharge electrode terminal is disposed in the region including the inside on the closed wall side of the housing. Therefore, a discharge is generated at a position away from the open end of the housing, the open end forming the discharge port for the combustion gas. Accordingly, combustion is stabilized inside the housing.

The discharge electrode terminal may be attached to the closed wall via an insulating body. In such a configuration, the discharge electrode terminal is unlikely to interfere with a tubular flow of the fuel and the oxidizing gas. Therefore, the fuel and the oxidizing gas easily flow inside the housing in a swirling manner, so that the ignition stability of the fuel is more improved.

The discharge electrode terminal may be disposed at a radially center portion of the housing inside the housing. In such a configuration, since a distance from the tip portion of the discharge electrode terminal to the housing is equal over the whole circumference of the housing, a discharge is uniformly generated between the tip portion of the discharge electrode terminal and the housing along a circumferential direction of the housing. Therefore, the ignition stability of the fuel is more improved.

The tip portion of the discharge electrode terminal may be located between an end on the closed wall side of the introduction portion and the closed wall. Even in such a configuration, the discharge electrode terminal is unlikely to interfere with a tubular flow of the fuel and the oxidizing gas. Therefore, the fuel and the oxidizing gas easily flow inside the housing in a swirling manner, so that the ignition stability of the fuel is more improved. In addition, since a discharge is generated at a position sufficiently away from the open end of the housing, combustion is more stabilized inside the housing.

According to one aspect of the present disclosure, there is provided a combustor that combusts a fuel mixed with an oxidizing gas, to generate combustion gas, the combustor including: a housing having a circular tubular shape of which one end side is open and of which the other end side is closed and through which the fuel, the oxidizing gas, and the combustion gas flow in an axial direction; at least one introduction portion that introduces the fuel and the oxidizing gas into the housing to generate a tubular flow; and an ignition unit that includes an ignition plug disposed on the other end side of the housing and that ignites the fuel introduced into the housing, to generate the combustion gas including a tubular flame. The ignition plug includes an insulator, a center electrode that is provided at a tip of a center pole supported by the insulator, to function as a discharge electrode, a metal shell having a cylindrical shape and being disposed around the insulator, and a ground electrode integrated with the metal shell. The ignition unit ignites the fuel by supplying a voltage to the center electrode and thus generating a discharge in a space between the center electrode and the ground electrode. The center electrode protrudes from a tip surface of the insulator. The ground electrode is disposed outside the center electrode in a radial direction of the metal shell so as not to overlap the center electrode in an axial direction of the metal shell.

In such a combustor, when the introduction portion introduces the fuel and the oxidizing gas into the housing having a circular tubular shape, the fuel and the oxidizing gas form a tubular flow and flow inside the housing toward the ignition plug. In that state, when a voltage is supplied to the center electrode, a discharge is generated in the space between the center electrode and the ground electrode, so that the fuel is ignited and combusted to generate combustion gas including a tubular flame. The combustion gas is discharged from one end of the housing.

Here, the ground electrode is integrated with the metal shell having a cylindrical shape and being disposed around the insulator, and is disposed outside the center electrode in the radial direction of the metal shell so as not to overlap the center electrode in the axial direction of the metal shell. For this reason, the ground electrode is prevented from interfering with a flow of the fuel and the oxidizing gas to the space between the center electrode and the ground electrode even when a flow of the fuel and the oxidizing gas toward the ignition plug is generated in a radially inner (center side) region of the housing inside the housing by a tubular flow of the fuel and the oxidizing gas. Therefore, the fuel and the oxidizing gas easily flow into the space between the center electrode and the ground electrode, so that a discharge generated in the space between the center electrode and the ground electrode easily acts on a mixture gas of the fuel and the oxidizing gas. In addition, after the fuel is ignited by the discharge, the flame burns and spreads to the surrounding mixed gas, but since the mixed gas flows as a tubular flow to the one end side of the housing in the axial direction of the metal shell, the tubular flame expands in the axial direction. At this time, the ground electrode is disposed not to overlap the center electrode in the axial direction of the metal shell. For this reason, when the fuel is ignited, heat is unlikely to be taken away from the tubular flame by the ground electrode and the tubular flame easily expands. As described above, the ignition and combustion operation of the fuel is stabilized.

The ground electrode may have a cylindrical shape and be integrated with the metal shell so as to be disposed around the insulator. In such a configuration, a structure of the existing ground electrode can be used.

A tip of the center electrode may be located on the one end side of the housing with respect to the ground electrode. In such a configuration, the fuel and the oxidizing gas easily flow from a center electrode side to a ground electrode side. Therefore, the fuel and the oxidizing gas more easily flow into the space between the center electrode and the ground electrode.

The center electrode may include a protrusion portion protruding in a radial direction of the ground electrode with respect to a peripheral edge of the tip surface of the insulator. A side end of the protrusion portion may be located in a region outside the tip surface of the insulator in the radial direction of the ground electrode and inside the ground electrode in the radial direction of the ground electrode. In such a configuration, when a voltage is supplied to the center electrode, a discharge is generated in a space between the protrusion portion and the ground electrode. Therefore, the discharge is generated in the space separated from the insulator, so that heat caused by the ignition of the fuel is unlikely to be taken away by the insulator. Accordingly, the ignition and combustion operation of the fuel is more stabilized.

The center electrode may have a circular shape. A diameter of the center electrode may be larger than a diameter of the tip surface of the insulator and smaller than a diameter of the ground electrode. The protrusion portion may be provided at a peripheral edge portion of the center electrode and have an annular shape. In such a configuration, a discharge can be generated in the space between the protrusion portion and the ground electrode over the whole circumference of the center electrode. In addition, since the shape of the center electrode is a circular shape, the center electrode can be easily manufactured.

A tip portion of the ground electrode may be provided with a projection protruding to the one end side of the housing. In such a configuration, when a voltage is supplied to the center electrode, a discharge is generated in a space between the center electrode and the projection. Therefore, the discharge is generated in the space separated from the insulator, so that heat caused by the ignition of the fuel is unlikely to be taken away by the insulator. Accordingly, the ignition and combustion operation of the fuel is more stabilized.

A tip of the projection may be located on the one end side of the housing with respect to the center electrode. In such a configuration, when a voltage is supplied to the center electrode, a discharge is generated in a space between the center electrode and a side surface of the projection. Therefore, the discharge is generated in the space sufficiently separated from the insulator, so that heat caused by the ignition of the fuel is more unlikely to be taken away by the insulator. Accordingly, the ignition and combustion operation of the fuel is even more stabilized.

The ground electrode may include an annular portion attached to the metal shell, and an erected portion provided on a tip surface of the annular portion to extend to the one end side of the housing. In such a configuration, when a voltage is supplied to the center electrode, a discharge is generated in a space between the center electrode and the erected portion. Therefore, the discharge is generated in the space separated from the insulator, so that heat caused by the ignition of the fuel is unlikely to be taken away by the insulator. Accordingly, the ignition and combustion operation of the fuel is more stabilized.

A plurality of the erected portions may be provided on the tip surface of the annular portion. The ground electrode may further include a connection portion connecting tips of the plurality of erected portions. A tip of the connection portion may be located on the one end side of the housing with respect to the center electrode. A distance between the center electrode and the erected portion may be shorter than a distance between the center electrode and the connection portion. In such a configuration, the tips of the plurality of erected portions are connected by the connection portion, thereby leading to an increase in the strength of the erected portions. In addition, when a voltage is supplied to the center electrode, a discharge is generated in a space between the center electrode and the erected portions, and a discharge is not generated in a space between the center electrode and the connection portion.

The metal shell may be fixed to the housing. The ground electrode may include a protrusion provided on an inner peripheral surface of the housing to protrude inward in a radial direction of the housing toward the center electrode. In such a configuration, when a voltage is supplied to the center electrode, a discharge is generated in a space between the center electrode and the protrusion. At this time, when the protrusion is disposed away from the insulator, heat caused by the ignition of the fuel is unlikely to be taken away by the insulator. Accordingly, the ignition and combustion operation of the fuel is more stabilized.

Advantageous Effects of Invention

According to the present disclosure, it is possible to improve the ignition stability of the fuel.

DESCRIPTION OF EMBODIMENTS

Figure 1:
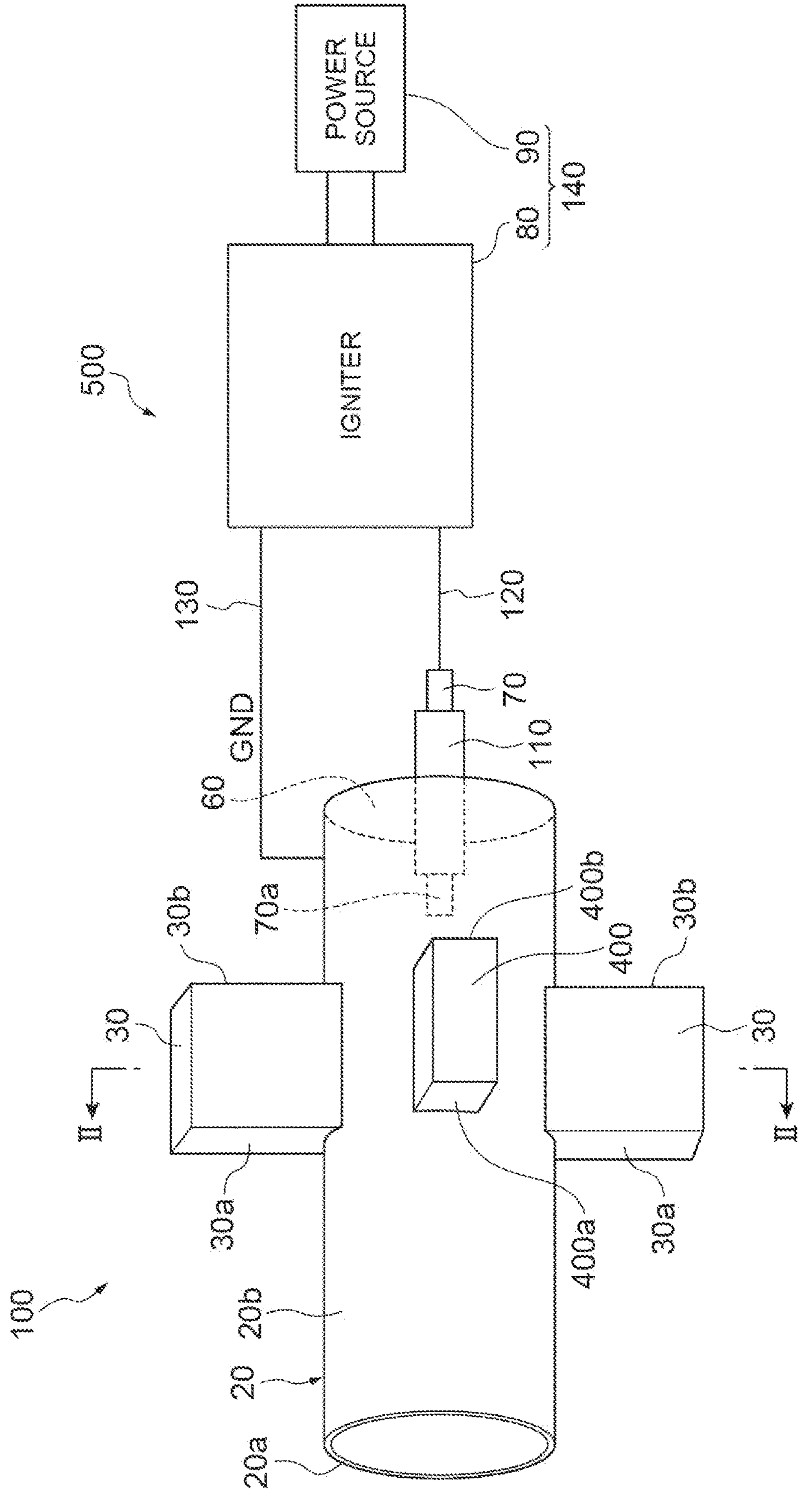
FIG. 1 is a configuration view illustrating a tubular flame burner according to a first embodiment of the present disclosure.

Hereinafter, embodiments of the present disclosure will be described in detail with reference to the drawings. Incidentally, in the drawings, the same or equivalent elements are denoted by the same reference signs, and duplicated descriptions will be omitted.

[First Embodiment] FIG. 1 is a configuration view illustrating a tubular flame burner according to one embodiment of the present disclosure. In FIG. 1, a tubular flame burner (combustor) 100 of the present embodiment is a device that mixes ammonia gas ($NH_3$ gas) that is a fuel and air that is an oxidizing gas to combust the ammonia gas.

The tubular flame burner 100 includes a housing 20 having a circular tubular shape, two ammonia gas introduction portions 30 that introduce the ammonia gas into the housing 20, two air introduction portions 400 that introduce the air into the housing 20, and an ignition unit 500 that ignites the ammonia gas introduced into the housing 20.

The housing 20 includes a circular cylindrical portion 20*b* of which both ends are open. One end of the housing 20 forms an open end 20*a* that is open. The open end 20*a* opens one end of the circular cylindrical portion 20*b* to the atmosphere and serves as a discharge port for combustion gas to be described later. A closed wall 60 having a circular plate shape is provided at the other end of the housing 20. The closed wall 60 closes the other end of the circular cylindrical portion 20*b*. The closed wall 60 is firmly fixed to the other end portion of the circular cylindrical portion 20*b*. The housing 20 is made of a metal material having conductivity (for example, stainless steel).

Figure 2:
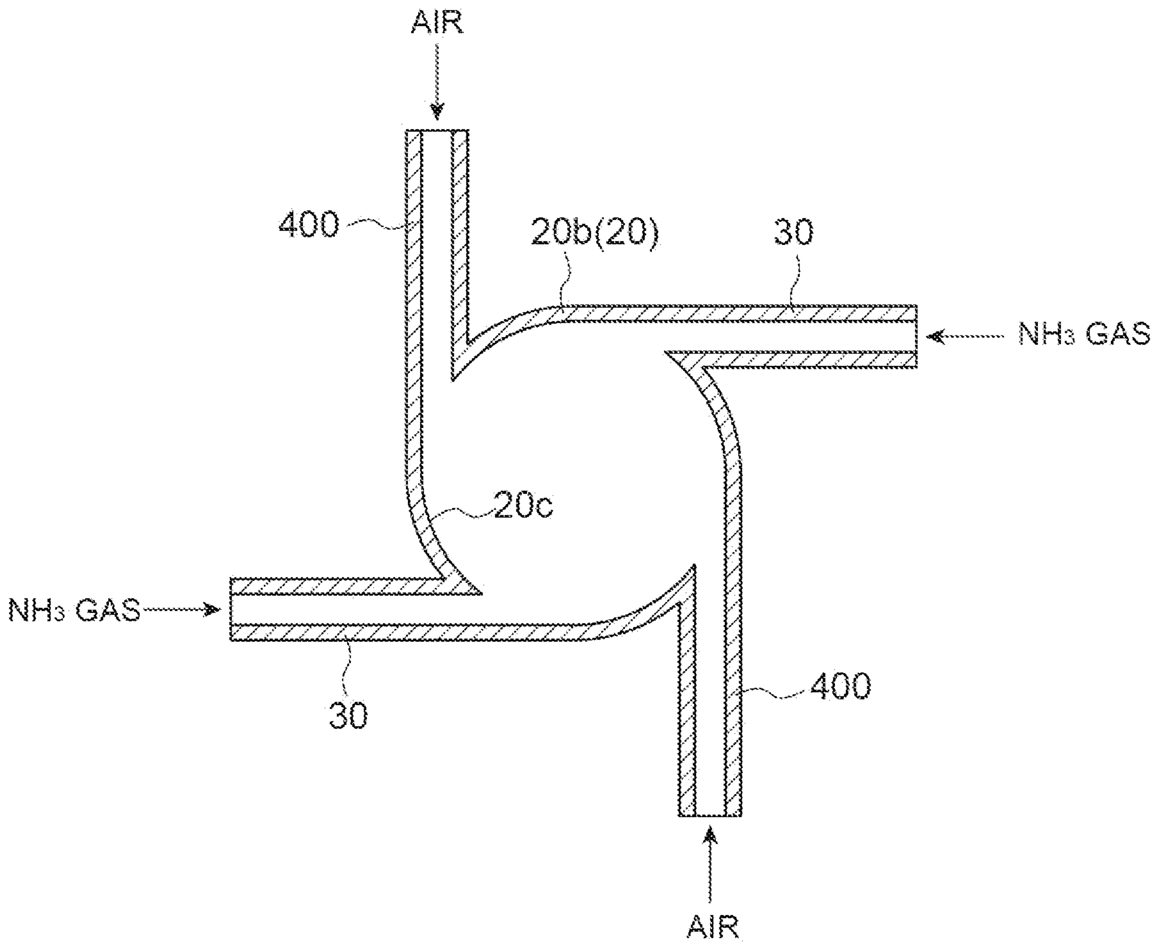
FIG. 2 is a cross-sectional view taken along line II-II of FIG. 1.

The ammonia gas introduction portion 30 and the air introduction portion 400 are introduction portions provided at a center portion in an axial direction of the housing 20 on an outer peripheral surface of the housing 20, or on a closed wall 60 side with respect to the center portion. As illustrated in FIG. 2, the ammonia gas introduction portions 30 and the air introduction portions 400 are alternately disposed at equal intervals along a circumferential direction of the housing 20. The ammonia gas introduction portion 30 introduces the ammonia gas into the housing 20 in a tangential direction of an inner peripheral surface 20*c* of the housing 20. Namely, the ammonia gas introduction portion 30 introduces the ammonia gas into the housing 20 to generate a tubular flow. The air introduction portion 400 introduces the air into the housing 20 in the tangential direction of the inner peripheral surface 20*c* of the housing 20. Namely, the air introduction portion 400 introduces the air into the housing 20 to generate a tubular flow. The ammonia gas introduction portions 30 and the air introduction portions 400 may be integrally formed with the housing 20 or may be configured separately from the housing 20 and fixed to the housing 20.

The ignition unit 500 includes a discharge electrode terminal 70 disposed inside the housing 20, an ignitor 80 that applies a high voltage to the discharge electrode terminal 70 to ignite the ammonia gas, and a power source 90 that turns on and off the ignitor 80. The ignitor 80 and the power source 90 form a voltage supply unit 140 that supplies a voltage to the discharge electrode terminal 70.

The discharge electrode terminal 70 is disposed in a region including an inside on the closed wall 60 side of the housing 20. The inside on the closed wall 60 side of the housing 20 indicates a region on the closed wall 60 side inside the housing 20 with respect to a center in the axial direction (longitudinal direction) of the housing 20.

Specifically, the discharge electrode terminal 70 is attached to the closed wall 60 via an insulating body 110 to penetrate through the closed wall 60 of the housing 20. The insulating body 110 is made of an insulating material (for example, ceramic) having pressure resistance and heat resistance.

The discharge electrode terminal 70 is disposed at a radially center portion of the housing 20 inside the housing 20 to extend in the axial direction of the housing 20. A part of the discharge electrode terminal 70 is disposed inside the housing 20, and the remaining portion of the discharge electrode terminal 70 is disposed outside the housing 20.

A tip portion 70*a* of the discharge electrode terminal 70 is located between each of a front end 30*a* of the ammonia gas introduction portion 30 and a front end 400*a* of the air introduction portion 400 and the closed wall 60 of the housing 20. Here, the tip portion 70*a* of the discharge electrode terminal 70 is located between each of a rear end 30*b* of the ammonia gas introduction portion 30 and a rear end 400*b* of the air introduction portion 400 and the closed wall 60.

The tip portion 70*a* of the discharge electrode terminal 70 is an end portion of both end portions of the discharge electrode terminal 70, which is disposed inside the housing 20 (end portion on an open end 20*a* side). The front end 30*a* of the ammonia gas introduction portion 30 and the front end 400*a* of the air introduction portion 400 correspond to ends of the ammonia gas introduction portion 30 and the air introduction portion 400 on the open end 20*a* side of the housing 20. The rear end 30*b* of the ammonia gas introduction portion 30 and the rear end 400*b* of the air introduction portion 400 correspond to ends of the ammonia gas introduction portion 30 and the air introduction portion 400 on the closed wall 60 side of the housing 20.

The discharge electrode terminal 70 is connected to the ignitor 80 via an electric wire 120. A pulse voltage from the ignitor 80 is supplied to the discharge electrode terminal 70 via the electric wire 120. The discharge electrode terminal 70 functions as a discharge electrode. The housing 20 is connected to a ground line (GND line) of the ignitor 80 via an electric wire 130. Therefore, the housing 20 is grounded. The housing 20 functions as a ground electrode. A space that the ammonia gas and the air reach is provided between the discharge electrode terminal 70 and the housing 20.

Figure 3:
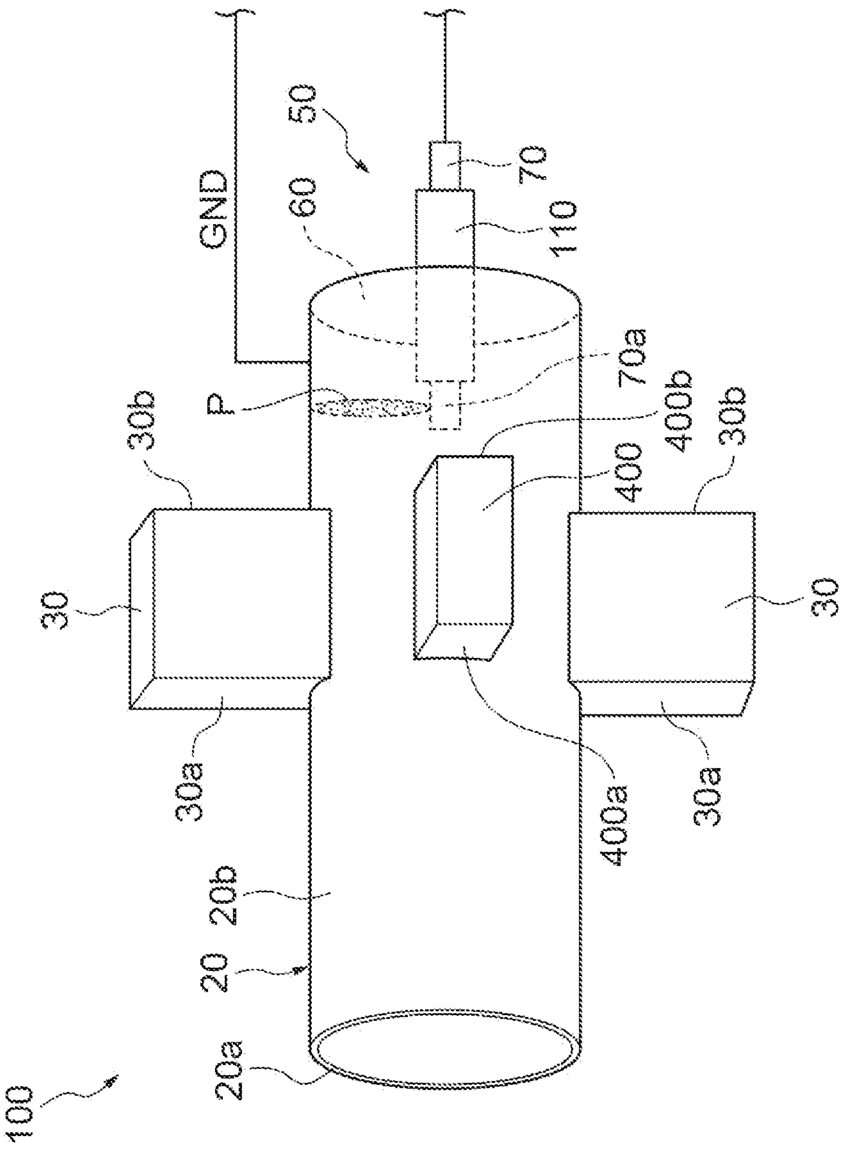
FIG. 3 is a view illustrating a state where a plasma caused by a discharge is formed inside a housing illustrated in FIG. 1.

The ignition unit 500 ignites the ammonia gas by applying a high voltage to the discharge electrode terminal 70 and thus generating a discharge between the tip portion 70*a* of the discharge electrode terminal 70 and the housing 20. At this time, as illustrated in FIG. 3, a plasma P is formed between the tip portion 70*a* of the discharge electrode terminal 70 and the housing 20 by the discharge generated between the tip portion 70*a* of the discharge electrode terminal 70 and the housing 20.

In the tubular flame burner 100 as described above, when the ammonia gas introduction portions 30 introduce the ammonia gas into the housing 20 in the tangential direction of the inner peripheral surface 20*c* of the housing 20, and the air introduction portions 400 introduce the air into the housing 20 in the tangential direction of the inner peripheral surface 20*c* of the housing 20, the ammonia gas and the air form a tubular flow and are mixed and flow inside the housing 20 in a swirling manner. At this time, a mixed gas of the ammonia gas and the air flows inside the housing 20 toward the open end 20*a* of the housing 20, and flows inside the housing 20 toward the closed wall 60 of the housing 20 to hit the closed wall 60 and then to flow while changing the direction.

In that state, when the power source 90 is turned on, the ignitor 80 applies a high voltage to the discharge electrode terminal 70, a discharge is generated between the tip portion 70*a* of the discharge electrode terminal 70 and the housing 20, and the plasma P is formed between the tip portion 70*a* of the discharge electrode terminal 70 and the housing 20 by the discharge. Then, the ammonia gas is ignited and combusted to form a tubular flame, so that high-temperature combustion gas is generated.

Here, since the ammonia gas and the air are introduced into the housing 20 in the tangential direction of the inner peripheral surface 20*c* of the housing 20, the flow speed of the ammonia gas and the gas is higher on a radially outer side of the housing 20 than on a radially inner side (center side) of the housing 20. However, since a discharge is generated in a wide range between the tip portion 70*a* of the discharge electrode terminal 70 and the housing 20, regardless of the flow speed and the air-fuel ratio of the ammonia gas and the air, the ammonia gas is easily ignited and combusted inside the housing 20.

The high-temperature combustion gas obtained by the combustion of the ammonia gas flows inside the housing 20 toward the open end 20*a* of the housing 20. Then, the combustion gas is discharged from the open end 20*a* forming the discharge port.

As described above, in the present embodiment, when the ammonia gas introduction portions 30 introduce the ammonia gas and the air into the housing 20 having a circular tubular shape to generate a tubular flow, the ammonia gas and the air form a tubular flow and flow inside the housing 20 in a swirling manner. At this time, the ammonia gas and the air flowing toward the closed wall 60 of the housing 20 hit the closed wall 60 and flow while changing the direction. In that state, when the voltage supply unit 140 supplies a voltage to the discharge electrode terminal 70, a discharge is generated between the tip portion 70*a* of the discharge electrode terminal 70 and the grounded housing 20, so that the ammonia gas is ignited and combusted to generate the combustion gas including a tubular flame. Then, the combustion gas flows inside the housing 20 toward the open end 20*a* of the housing 20 and is discharged from the open end 20*a*. Here, the discharge is generated in a wide range between the tip portion 70*a* of the discharge electrode terminal 70 and the housing 20. In addition, since the closed wall 60 side of the housing 20 is used as the ground electrode, the electrode area is substantially increased. In addition, a dielectric breakdown is directed from the discharge electrode terminal 70 toward the housing 20, and discharge paths are radially formed at 360 degrees. Therefore, the structure is unlikely to be affected by a local fluctuation in gas flow and a local surface condition of the housing 20, and the ignition stability of the ammonia gas is improved. As a result, for example, unlike a case where a discharge is generated in a narrow range only in the vicinity of the tip portion 70*a* of the discharge electrode terminal 70, it is not necessary to locally adjust the flow speed and the air-fuel ratio of the ammonia gas.

In addition, the discharge electrode terminal 70 is disposed in the region including the inside on the closed wall 60 side of the housing 20. Therefore, a discharge is generated at a position away from the open end 20*a* of the housing 20, the open end 20*a* forming the discharge port for the combustion gas. Accordingly, combustion is stabilized inside the housing 20.

In addition, in the present embodiment, the discharge electrode terminal 70 is attached to the closed wall 60 of the housing 20 via the insulating body 110. Hence, the discharge electrode terminal 70 is unlikely to interfere with a tubular flow of the ammonia gas and the air. Therefore, the ammonia gas and the air easily flow inside the housing 20 in a swirling manner, so that the ignition stability of the ammonia gas is more improved.

In addition, in the present embodiment, the discharge electrode terminal 70 is disposed at the radially center portion of the housing 20 inside the housing 20. Hence, the distance from the tip portion 70*a* of the discharge electrode terminal 70 to the housing 20 is equal over the whole circumference of the housing 20, so that a discharge is uniformly generated between the tip portion 70*a* of the discharge electrode terminal 70 and the housing 20 along the circumferential direction of the housing 20. Therefore, the ignition stability of the ammonia gas is more improved.

In addition, in the present embodiment, the tip portion 70*a* of the discharge electrode terminal 70 is located between the rear end 30*b* of the ammonia gas introduction portion 30 and the closed wall 60, the tip portion 70*a* of the discharge electrode terminal 70 is located between the rear end 400*b* of the air introduction portion 400 and the closed wall 60. Hence, the discharge electrode terminal 70 is more unlikely to interfere with a tubular flow of the ammonia gas and the air. Therefore, the ammonia gas and the air more easily flow inside the housing 20 in a swirling manner, so that the ignition stability of the ammonia gas is even more improved. In addition, since a discharge is generated at a position sufficiently away from the open end 20*a* of the housing 20, combustion is more stabilized inside the housing 20.

Figure 4:
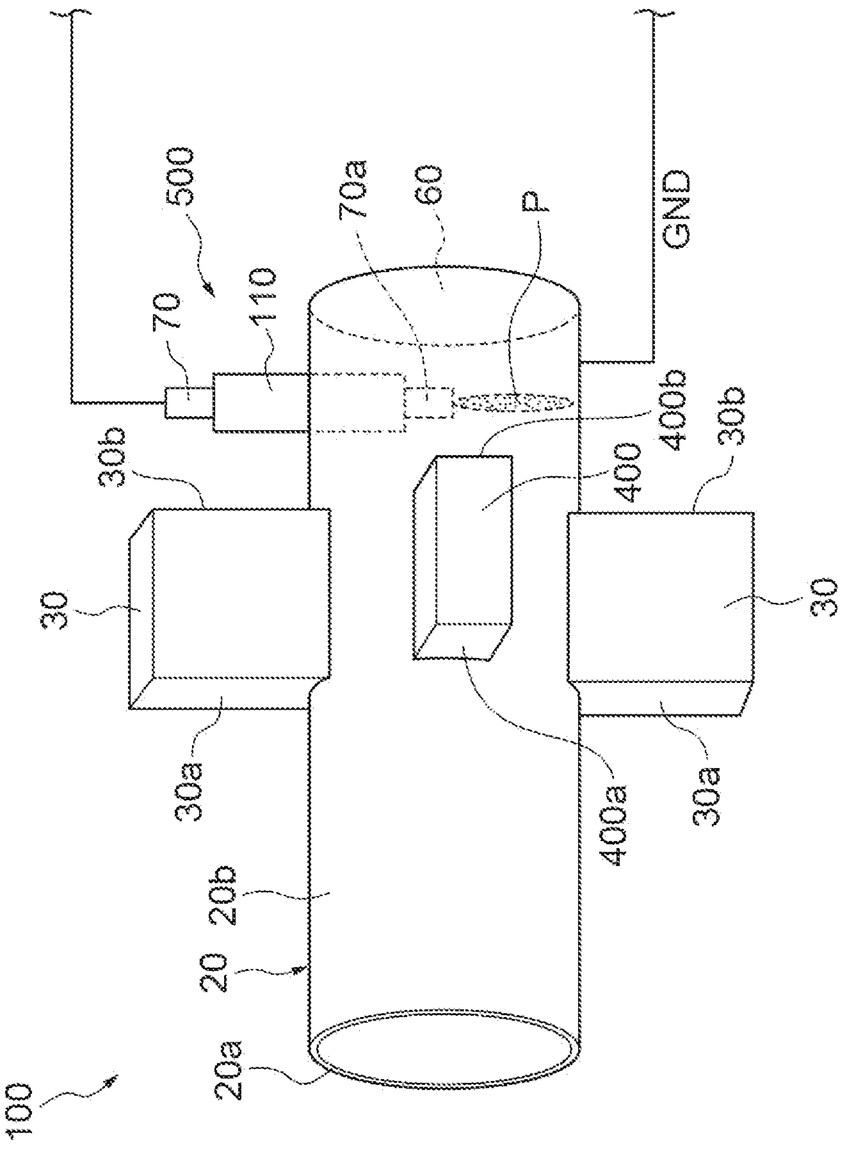
FIG. 4 is a view illustrating a state where a plasma caused by a discharge is formed inside the housing in a modification example of the tubular flame burner illustrated in FIG. 3.

FIG. 4 is a configuration view illustrating a modification example of the tubular flame burner 100 illustrated in FIG. 3. In FIG. 4, in the tubular flame burner 100 of the present modification example, the discharge electrode terminal 70 is attached to the circular cylindrical portion 20*b* of the housing 20 via the insulating body 110.

Specifically, the discharge electrode terminal 70 is attached to the circular cylindrical portion 20*b* via the insulating body 110 to penetrate through the circular cylindrical portion 20*b* of the housing 20. The discharge electrode terminal 70 is disposed to extend in a radial direction of the housing 20. The tip portion 70*a* of the discharge electrode terminal 70 is located at the radially center portion of the housing 20 between each of the rear end 30*b* of the ammonia gas introduction portion 30 and the rear end 400*b* of the air introduction portion 400 and the closed wall 60. As described above, in the present modification example, the degree of freedom in the disposition of the discharge electrode terminal 70 is increased.

Incidentally, the present disclosure is not limited to the above embodiment. For example, in the above embodiment, the discharge electrode terminal 70 is disposed at the radially center portion of the housing 20 inside the housing 20, but the present disclosure is not particularly limited to such a form. For example, depending on the value of a voltage applied to the discharge electrode terminal 70, the discharge electrode terminal 70 may be disposed to be radially offset from the radially center portion of the housing 20 inside the housing 20.

In addition, in the above embodiment, the tip portion 70*a* of the discharge electrode terminal 70 is located between the rear end 30*b* of the ammonia gas introduction portion 30 and the closed wall 60, but the present disclosure is not particularly limited to such a form. The tip portion 70*a* of the discharge electrode terminal 70 may be located between the front end 30*a* and the rear end 30*b* of the ammonia gas introduction portion 30.

In addition, in the above embodiment, the two ammonia gas introduction portions 30 that introduce the ammonia gas into the housing 20 in the tangential direction of the inner peripheral surface 20*c* of the housing 20, and the two air introduction portions 400 that introduce the air into the housing 20 in the tangential direction of the inner peripheral surface 20*c* of the housing 20 are provided, but the number of the ammonia gas introduction portions 30 and of the air introduction portions 400 may be 1 or 3 or more.

In addition, in the above embodiment, the ammonia gas introduction portions 30 and the air introduction portions 400 separately introduce the ammonia gas and the air into the housing 20 in the tangential direction of the inner peripheral surface 20*c* of the housing 20, but the present disclosure is not particularly limited to such a form, and at least one introduction portion that introduces a mixed gas of the ammonia gas and the air into the housing 20 in the tangential direction of the inner peripheral surface 20*c* of the housing 20 may be provided.

In addition, in the above embodiment, the ammonia gas is introduced as a fuel into the housing 20 in the tangential direction of the inner peripheral surface 20*c* of the housing 20, but the fuel is not particularly limited to the ammonia gas, and may be a fuel gas such as hydrocarbon gas, methane gas, or city gas or may be a liquid fuel or the like that vaporizes at a relatively low temperature, such as liquid ammonia, kerosene, alcohol, or A-type heavy oil.

In addition, in the above embodiment, the air is introduced as an oxidizing gas into the housing 20 in the tangential direction of the inner peripheral surface 20*c* of the housing 20, but the oxidizing gas is not particularly limited to the air and may be oxygen.

Figure 5:
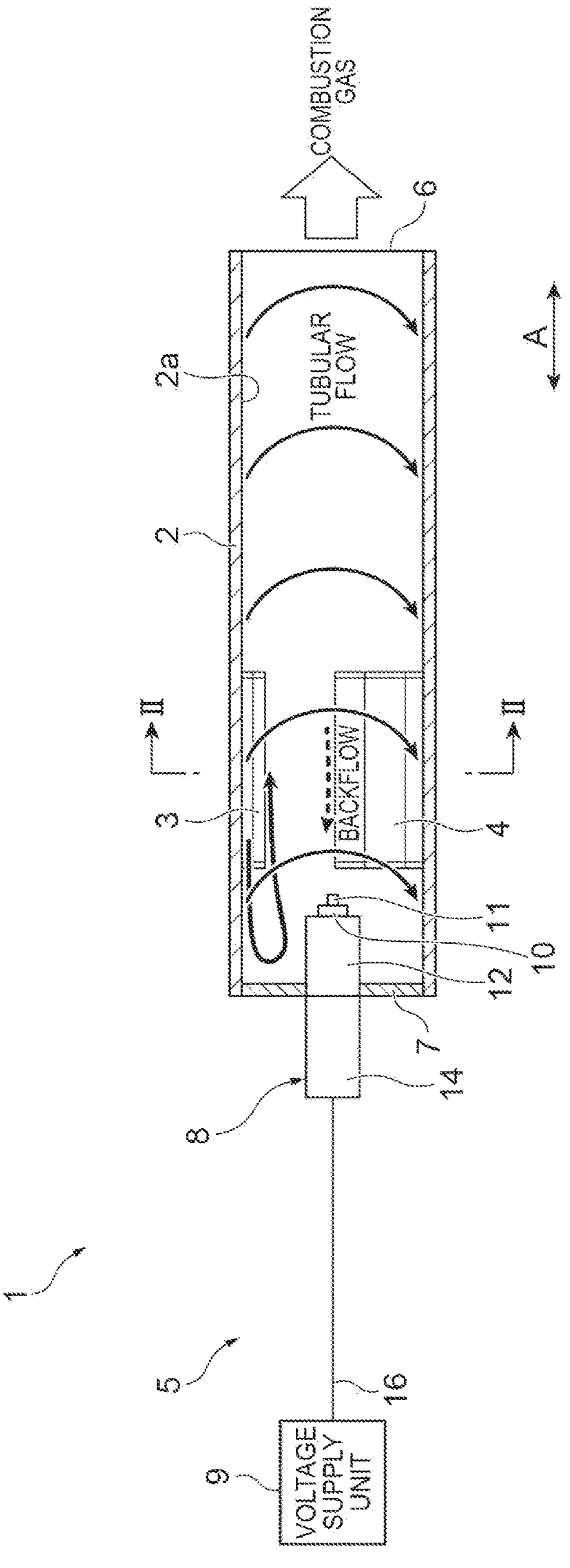
FIG. 5 is a cross-sectional view illustrating a combustor according to a second embodiment of the present disclosure.

[Second Embodiment] FIG. 5 is a cross-sectional view illustrating a combustor according to a second embodiment of the present disclosure. In FIG. 5, a combustor 1 of the present embodiment is a tubular flame burner that combusts ammonia gas ($NH_3$ gas) mixed with air, to generate combustion gas. The ammonia gas is a fuel. The air is an oxidizing gas.

Figure 6:
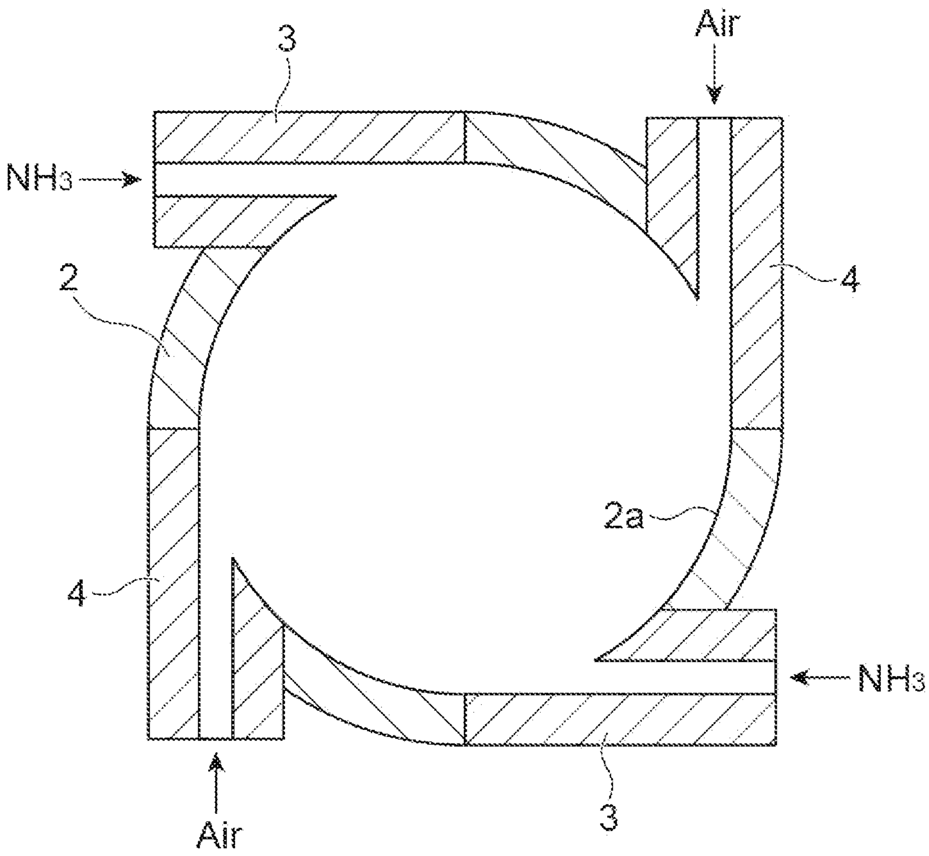
FIG. 6 is a cross-sectional view taken along line II-II of FIG. 5.

As illustrated in FIG. 6, the combustor 1 includes a housing 2 having a circular tubular shape, two ammonia gas introduction portions 3 that introduce the ammonia gas into the housing 2, two air introduction portions 4 that introduce the air into the housing 2, and an ignition unit 5 that ignites the ammonia gas introduced into the housing 2.

One end side of the housing 2 is open and the other end side of the housing 2 is closed. One end of the housing 2 forms a gas outlet portion 6 from which combustion gas is discharged. A closed wall 7 is provided at the other end of the housing 2. The housing 2 and the closed wall 7 are made of a metal material having conductivity (for example, stainless steel). The ammonia gas, the air, and the combustion gas flow inside the housing 2 in an axial direction (direction A) of the housing 2.

For example, the ammonia gas introduction portions 3 and the air introduction portions 4 are disposed on a closed wall 7 side with respect to a center portion in the axial direction of the housing 2. As illustrated in FIG. 2, the ammonia gas introduction portions 3 and the air introduction portions 4 are alternately disposed at equal intervals along a circumferential direction of the housing 2. The ammonia gas introduction portion 3 and the air introduction portion 4 are introduction portions that introduce the ammonia gas and the air into the housing 2 to generate a tubular flow.

Incidentally, the number of the ammonia gas introduction portions 3 and of the air introduction portions 4 is not particularly limited to 2 and may be 1 or 3 or more. In addition, the ammonia gas introduction portions 3 and the air introduction portions 4 may be provided at the center portion in the axial direction of the housing 2 or may be provided on a gas outlet portion 6 side with respect to the center portion in the axial direction of the housing 2.

Specifically, the ammonia gas introduction portion 3 introduces the ammonia gas into the housing 2 in a tangential direction of an inner peripheral surface 2*a* of the housing 2. The air introduction portion 4 introduces the air into the housing 2 in the tangential direction of the inner peripheral surface 2*a* of the housing 2. The ammonia gas introduction portions 3 and the air introduction portions 4 may be integrally formed with the housing 2 or may be configured separately from the housing 2 and fixed to the housing 2.

The ignition unit 5 ignites the ammonia gas introduced into the housing 2, to generate the combustion gas including a tubular flame. The ignition unit 5 includes an ignition plug 8 disposed on the other end side (closed wall 7 side) of the housing 2, and a voltage supply unit 9 that supplies a voltage to the ignition plug 8. The ignition plug 8 penetrates through the closed wall 7. A tip side portion of the ignition plug 8 is disposed inside the housing 2.

Figure 7:
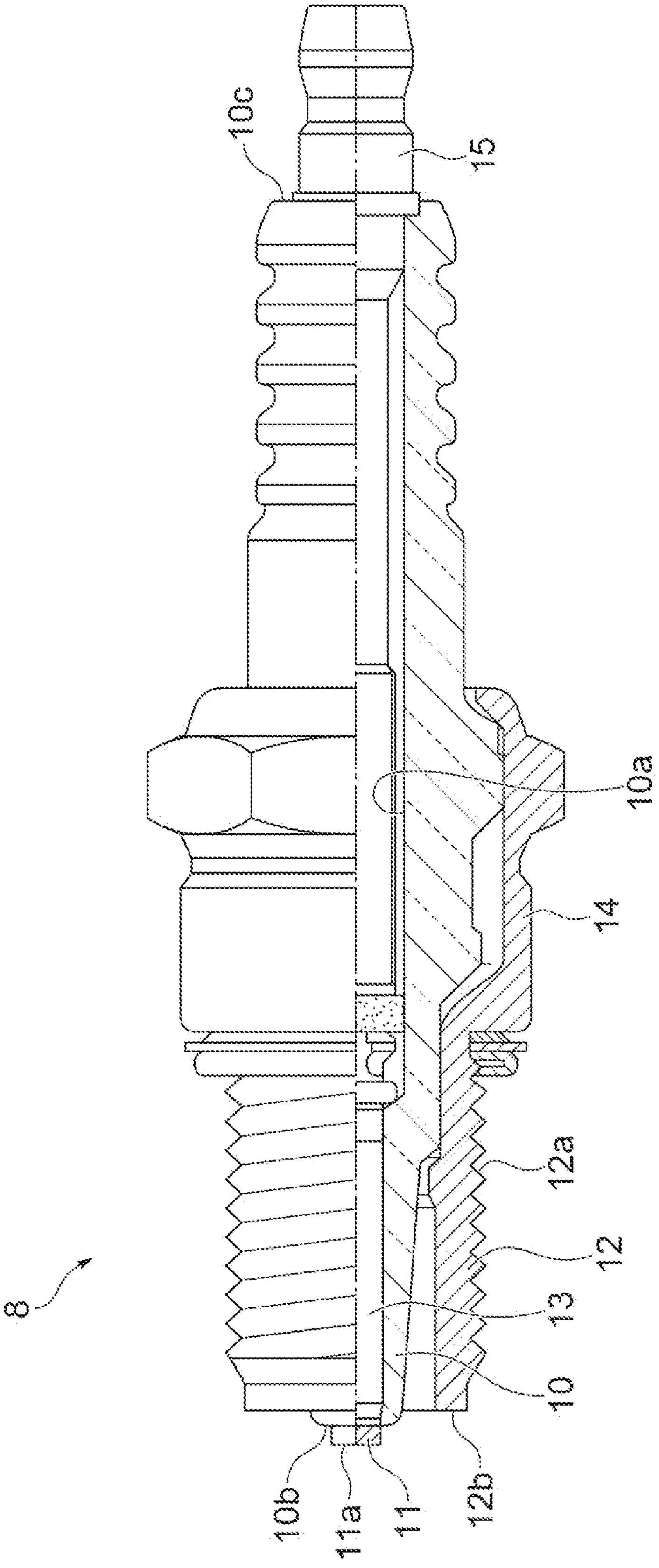
FIG. 7 is a side cut-away view of an ignition plug illustrated in FIG. 5.
Figure 8:
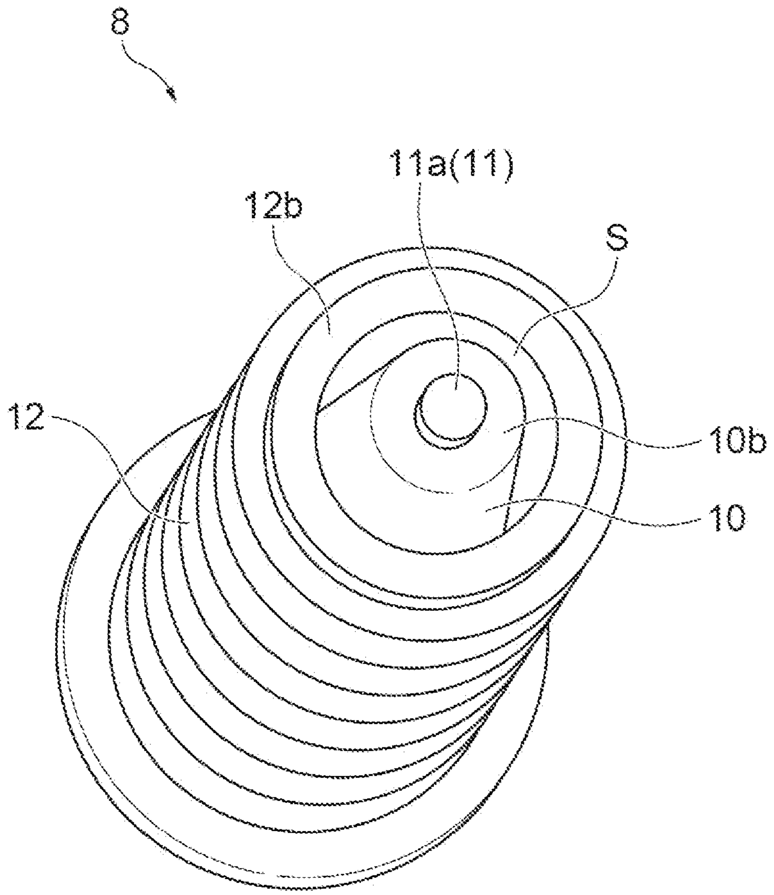
FIG. 8 is a schematic front view of the ignition plug illustrated in FIG. 7.

FIG. 7 is a side cut-away view of the ignition plug 8. FIG. 8 is a schematic front view of the ignition plug 8. In FIGS. 7 and 8, the ignition plug 8 is a plug that ignites a mixed gas of the ammonia gas and the air. The ignition plug 8 includes an insulator 10, a center electrode 11, and a ground electrode 12. Incidentally, in FIG. 5, the ignition plug 8 is illustrated in a simplified manner. In addition, in FIGS. 7 and 8, the housing 2 and the closed wall 7 are omitted.

The insulator 10 has a circular cylindrical shape. The insulator 10 is made of ceramic, such as alumina, having good insulation, heat resistance, and thermal conductivity. The insulator 10 is provided with an axial hole 10*a* extending in an axial direction of the insulator 10.

The center electrode 11 is provided at a tip of a center pole 13 having a round bar shape and being supported by the insulator 10. The center pole 13 is supported by the insulator 10 in a state where the center pole 13 is inserted into the axial hole 10*a* of the insulator 10. The center pole 13 is made of, for example, a steel material or the like.

The center electrode 11 protrudes from a tip surface 10*b* of the insulator 10. Namely, the center electrode 11 is exposed from the tip surface 10*b* of the insulator 10. The center electrode 11 has a circular shape in a front view. The center electrode 11 is made of, for example, a metal material such as a nickel alloy having good heat resistance and corrosion resistance. Incidentally, a noble metal tip may be provided on a tip surface 11*a* of the center electrode 11.

The ground electrode 12 is integrated with a metal shell 14 disposed around the insulator 10. The metal shell 14 is fixed to an outer peripheral surface of the insulator 10. The metal shell 14 has a circular cylindrical shape. Incidentally, the circular cylindrical shape referred to in the present embodiment is not limited to a perfect circular cylindrical shape and also includes a substantially circular cylindrical shape.

The ground electrode 12 is joined to a tip of the metal shell 14 by welding or the like. The ground electrode 12 is an electrode having a circular cylindrical shape and being disposed around the insulator 10. The ground electrode 12 is made of a metal material such as a nickel alloy having good heat resistance and corrosion resistance. The ground electrode 12 is grounded.

The ground electrode 12 is fixed to the closed wall 7. A male screw portion 12*a* to be screwed to a female screw portion 7*a* (refer to FIG. 21) provided in the closed wall 7 is formed in an outer peripheral surface of the ground electrode 12. The ignition plug 8 including the ground electrode 12 is fixed to the closed wall 7 by screwing the ground electrode 12 into the closed wall 7. Incidentally, the ignition plug 8 is fixed to the closed wall 7 such that the center electrode 11 is located at a radially center portion of the housing 2 inside the housing 2.

The metal shell 14 is fixed to the housing 2 via the ground electrode 12 and via the closed wall 7. At this time, an axial direction of the ground electrode 12 and the metal shell 14 coincides with the axial direction (direction A in FIG. 5) of the housing 2. Incidentally, the coincidence of the axial directions referred to in the present embodiment is not limited to a perfect coincidence and also includes a coincidence by appearance.

The ground electrode 12 is disposed outside the center electrode 11 in a radial direction so as not to overlap the center electrode 11 in the axial direction of the ground electrode 12. Namely, the ground electrode 12 is disposed at a constant interval from the center electrode 11 in the radial direction. The tip surface 11*a* of the center electrode 11 protrudes from a tip surface 12*b* of the ground electrode 12. Namely, the tip surface 11*a* of the center electrode 11 is located on the one end side (gas outlet portion 6 side) of the housing 2 with respect to the tip surface 12*b* of the ground electrode 12. A space S that the ammonia gas and the air reach is provided between the center electrode 11 and the ground electrode 12.

A base end portion of the ignition plug 8 is provided with a terminal metal fixture 15. The terminal metal fixture 15 is electrically connected to the center pole 13. The terminal metal fixture 15 is exposed from a base end surface 10*c* of the insulator 10 to be located outside the housing 2.

As illustrated in FIG. 5, the voltage supply unit 9 is connected to the terminal metal fixture 15 of the ignition plug 8 via a high-voltage cable 16. The voltage supply unit 9 applies a high voltage to the center electrode 11 via the high-voltage cable 16, via the terminal metal fixture 15, and via the center pole 13.

The center electrode 11 functions as a discharge electrode. The ignition unit 5 ignites the ammonia gas by causing the voltage supply unit 9 to apply a high voltage to the center electrode 11 and thus generating a discharge in the space S between the center electrode 11 and the ground electrode 12 in the ignition plug 8. At this time, the discharge is generated in a region where the distance between a tip portion of the center electrode 11 and the ground electrode 12 is at its shortest in the space S between the tip portion of the center electrode 11 and the ground electrode 12.

In the combustor 1 as described above, when the ammonia gas introduction portions 3 introduce the ammonia gas into the housing 2 in the tangential direction of the inner peripheral surface 2*a* of the housing 2, and the air introduction portions 4 introduce the air into the housing 2 in the tangential direction of the inner peripheral surface 2*a* of the housing 2, the ammonia gas and the air form a tubular flow and are mixed and flow inside the housing 2 in a swirling manner. At this time, a mixed gas of the ammonia gas and the air flows inside the housing 2 toward the gas outlet portion 6 and flows inside the housing 2 toward the ignition plug 8.

Figure 9:
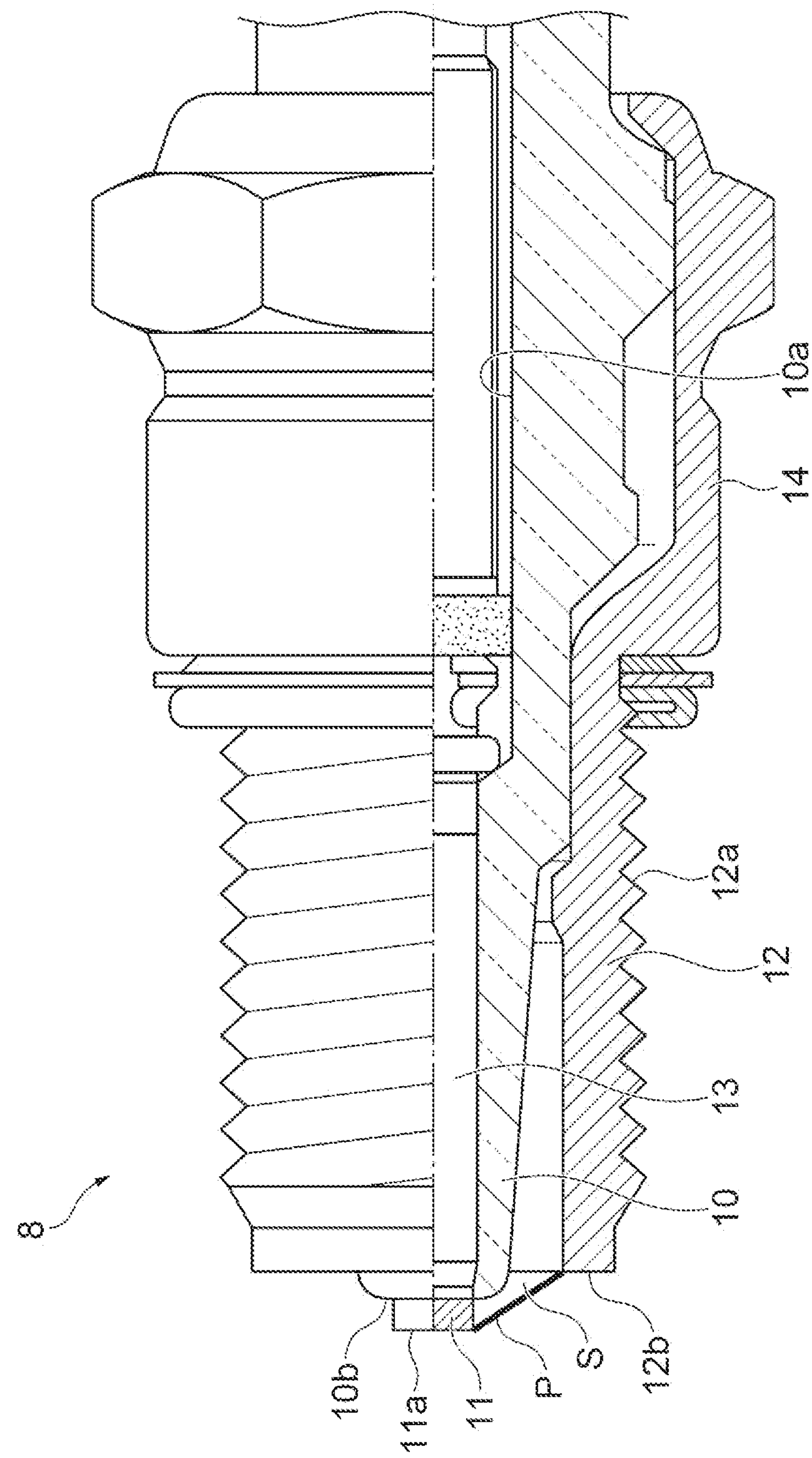
FIG. 9 is a side cut-away view illustrating a mode in which a discharge is generated in a space between a center electrode and a ground electrode in the ignition plug illustrated in FIG. 7.

In that state, when a power source of the voltage supply unit 9 is turned on, the voltage supply unit 9 applies a high voltage to the center electrode 11 of the ignition plug 8 via the terminal metal fixture 15 and via the center pole 13. Then, as illustrated in FIG. 9, a discharge P is generated in the space S between the tip portion of the center electrode 11 and the tip surface 12*b* of the ground electrode 12 in the ignition plug 8. At this time, the center electrode 11 protrudes from the tip surface 10*b* of the insulator 10. For this reason, the discharge P generated in the space S between the center electrode 11 and the ground electrode 12 is easily separated from the insulator 10.

The ammonia gas is ignited and combusted by the discharge P, to form a tubular flame, so that high-temperature combustion gas is generated. The high-temperature combustion gas flows inside the housing 2 toward the gas outlet portion 6 and is discharged from the gas outlet portion 6.

Figure 10:
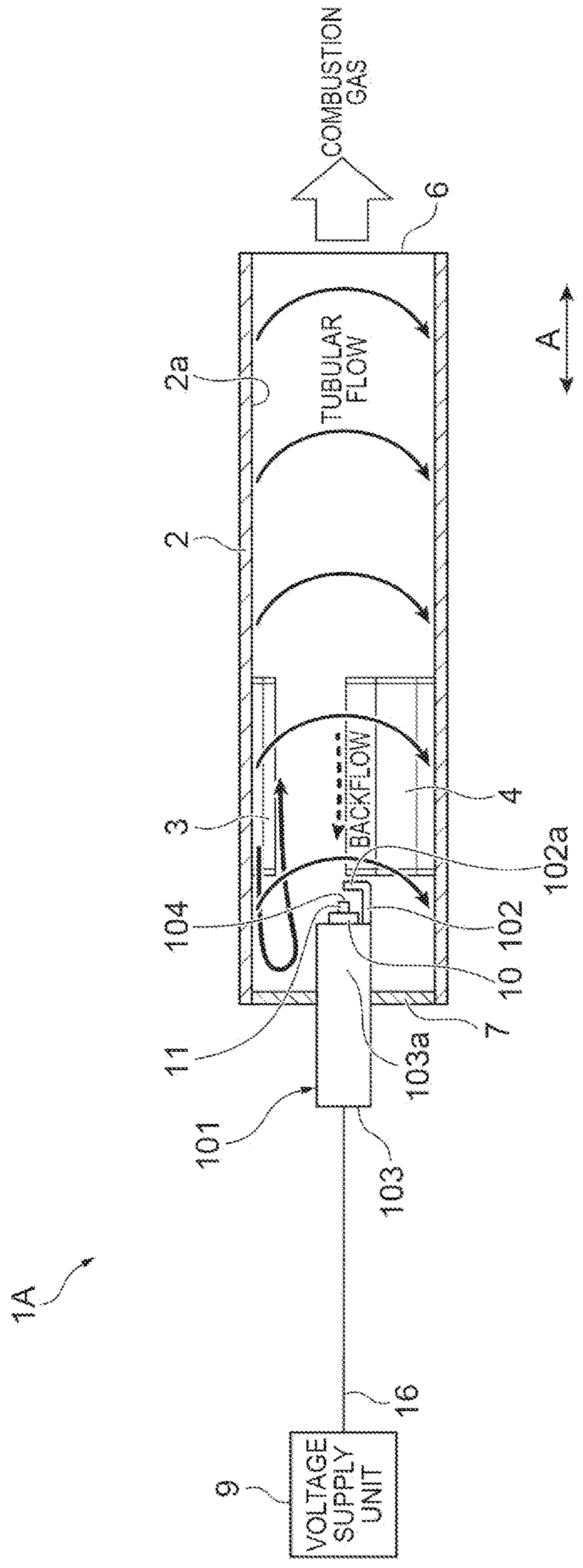
FIG. 10 is a cross-sectional view illustrating a combustor as a comparative example.

FIG. 10 is a cross-sectional view illustrating a combustor as a comparative example. In FIG. 10, a combustor 1A of the present comparative example includes an ignition plug 101 for an internal combustion engine. The ignition plug 101 includes the insulator 10 and the center electrode 11 that are the same as those of the ignition plug 8, and a ground electrode 102.

The ground electrode 102 is integrated with a metal shell 103 having a circular cylindrical shape and being disposed around the insulator 10. A male screw portion 103*a* to be screwed into a screw hole (not illustrated) of an internal combustion engine is provided in an outer peripheral surface of a tip side portion of the metal shell 103. The ground electrode 102 is joined to a tip of the metal shell 103 by welding or the like. The ground electrode 102 is bent in an L shape toward a center electrode 11 side (radially center side of the ground electrode 102). A space between the center electrode 11 and a tip portion 102*a* of the ground electrode 102 is a discharge gap 104 at which a discharge is generated. The ammonia gas and the air flow into the discharge gap 104 in a radial direction of the housing 2.

By the way, the ammonia gas and the air are introduced into the housing 2 in the tangential direction of the inner peripheral surface 2*a* of the housing 2 and flow as a tubular flow inside the housing 2 in a swirling manner. The introduction positions of the ammonia gas and the air are positions in the vicinity of the ignition plug 101. For this reason, in the vicinity of the ignition plug 101, the flow speed of the ammonia gas and the air is higher on a radially outer side of the housing 2 than a radially inner side (center side) of the housing 2. At this time, a phenomenon that a flow (backflow) of the ammonia gas and the air toward the ignition plug 101 occurs in a radially inner region of the housing 2 inside the housing 2 before the ignition of the ammonia gas has been confirmed by a simulation.

Since the backflow of the ammonia gas and the air is a flow in the axial direction of the housing 2, the ground electrode 102 interferes with the flow of the ammonia gas and the air to the discharge gap 104. For this reason, the ammonia gas and the air to flow are unlikely to flow into the discharge gap 104. Therefore, a discharge generated in the discharge gap 104 is unlikely to act on a mixed gas of the ammonia gas and the air, so that it is difficult to stabilize an operation of igniting the ammonia gas and causing a tubular flame to grow.

In response to such a problem, in the present embodiment, the ground electrode 12 is integrated with the metal shell 14 disposed around the insulator 10, and is disposed outside the center electrode 11 in a radial direction of the metal shell 14 so as not to overlap the center electrode 11 in the axial direction of the metal shell 14. For this reason, the ground electrode 12 is prevented from interfering with a flow of the ammonia gas and the air to the space S between the center electrode 11 and the ground electrode 12 even when a flow of the ammonia gas and the air toward the ignition plug 8 is generated in the radially inner (center side) region of the housing 2 inside the housing 2 by a tubular flow of the ammonia gas and the air. Therefore, the ammonia gas and the air easily flow into the space S between the center electrode 11 and the ground electrode 12, so that a discharge generated in the space S between the center electrode 11 and the ground electrode 12 easily acts on a mixture gas of the ammonia gas and the air. In addition, after the ammonia gas is ignited by the discharge, the flame burns and spreads to the surrounding mixed gas, but since the mixed gas flows as a tubular flow to the one end side of the housing 2 in the axial direction of the metal shell 14, the tubular flame expands in the axial direction. At this time, the ground electrode 12 is disposed not to overlap the center electrode 11 in the axial direction of the metal shell 14. For this reason, when the ammonia gas is ignited, heat is unlikely to be taken away from the tubular flame by the ground electrode 12 and the tubular flame easily expands. As described above, the ignition and combustion operation of the ammonia gas is stabilized.

In addition, in the present embodiment, the ground electrode 12 has a circular cylindrical shape and is integrated with the metal shell 14 so as to be disposed around the insulator 10. Therefore, a structure of the existing ground electrode can be used.

In addition, in the present embodiment, the tip surface 11*a* of the center electrode 11 is located on the one end side (gas outlet portion 6 side) of the housing 2 with respect to the ground electrode 12. For this reason, the ammonia gas and the air easily flow from a center electrode 11 side to a ground electrode 12 side. Therefore, the ammonia gas and the air more easily flow into the space S between the center electrode 11 and the ground electrode 12.

Figure 11:
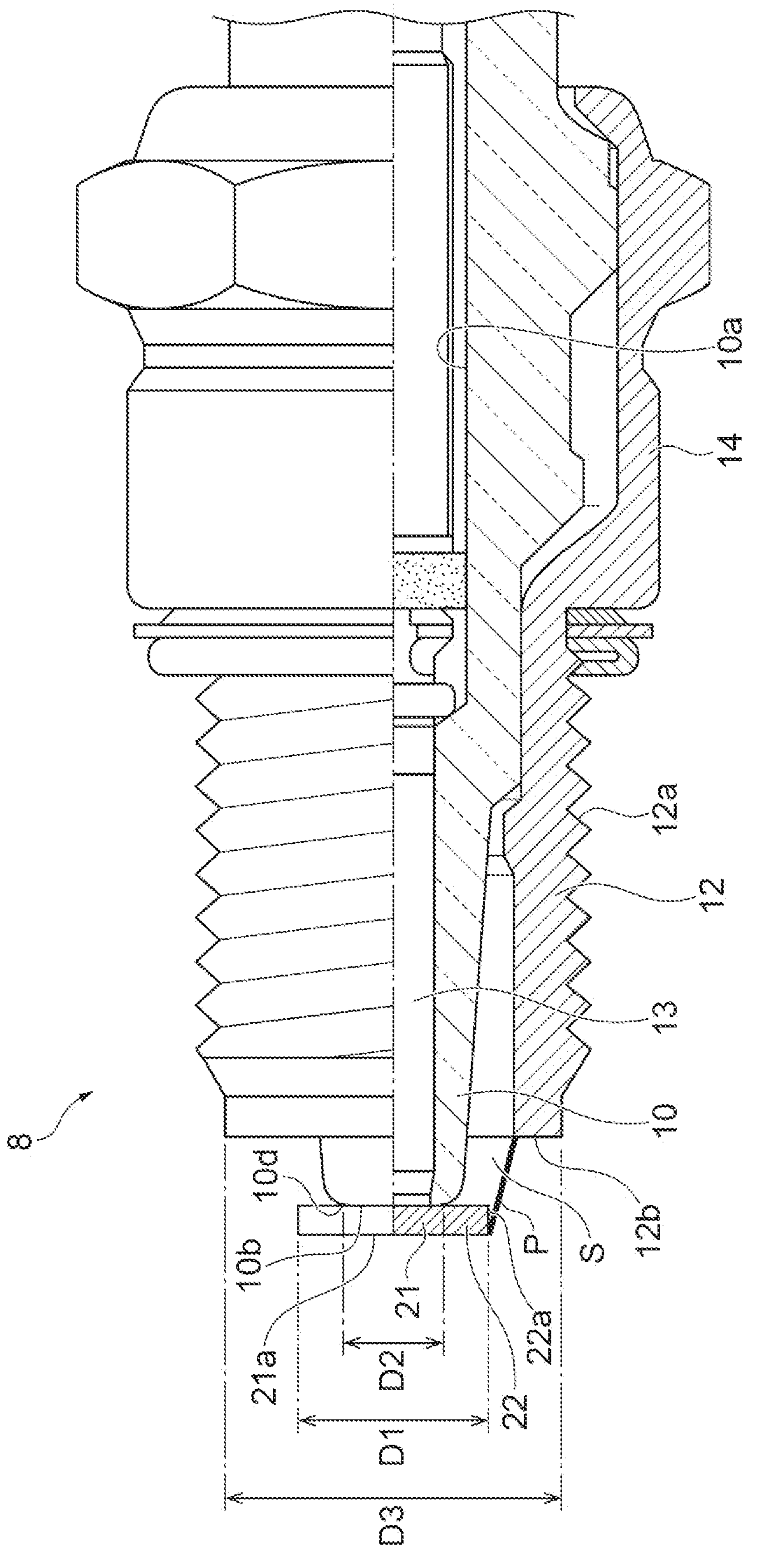
FIG. 11 is a side cut-away view illustrating an ignition plug in a combustor according to a third embodiment of the present disclosure.
Figure 12:
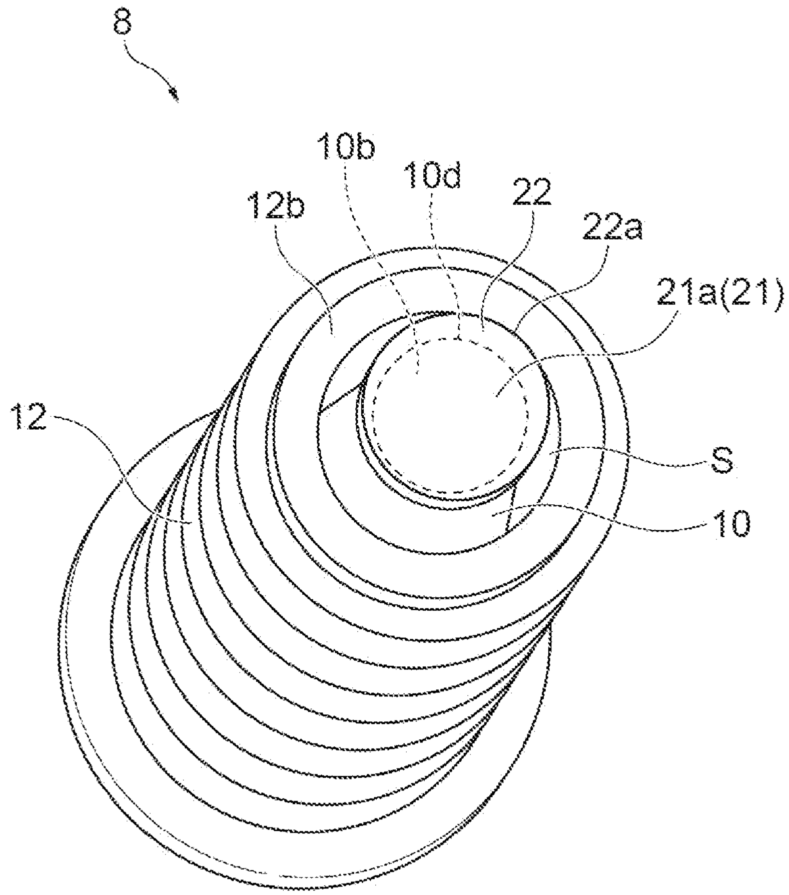
FIG. 12 is a schematic front view of the ignition plug illustrated in FIG. 11.

[Third Embodiment] FIG. 11 is a side cut-away view illustrating an ignition plug in a combustor according to a third embodiment of the present disclosure. FIG. 12 is a schematic front view of the ignition plug illustrated in FIG. 11. In FIGS. 11 and 12, in the combustor 1 of the present embodiment, the ignition plug 8 includes a center electrode 21 instead of the center electrode 11 in the second embodiment.

The center electrode 21 has a circular shape in a front view. A tip surface 21*a* of the center electrode 21 is located on the one end side (gas outlet portion 6 side) of the housing 2 with respect to the tip surface 12*b* of the ground electrode 12. A diameter D1 of the center electrode 21 is larger than a diameter D2 of the tip surface 10*b* of the insulator 10 and smaller than a diameter D3 (outer diameter) of the tip surface 12*b* of the ground electrode 12.

Therefore, the center electrode 21 includes a protrusion portion 22 protruding outward in a radial direction of the insulator 10 with respect to a peripheral edge 10*d* of the tip surface 10*b* of the insulator 10. A side end 22*a* of the protrusion portion 22 is located in a region outside the peripheral edge 10*d* of the tip surface 10*b* of the insulator 10 in the radial direction of the insulator 10 and inside an outer periphery of a tip portion of the ground electrode 12 in a radial direction of the ground electrode 12. The protrusion portion 22 is provided at a peripheral edge portion of the center electrode 21 and has an annular shape.

In the combustor 1 including the ignition plug 8, when the voltage supply unit 9 applies a high voltage to the center electrode 21 of the ignition plug 8 via the terminal metal fixture 15 and via the center pole 13, the discharge P is generated in the space S between the protrusion portion 22 of the center electrode 21 and the tip surface 12*b* of the ground electrode 12 in the ignition plug 8, and the ammonia gas is ignited and combusted.

As described above, in the present embodiment, when a voltage is supplied to the center electrode 21, a discharge is generated in the space S between the protrusion portion 22 of the center electrode 21 and the ground electrode 12. Therefore, the discharge is generated in the space separated from the insulator 10, so that heat caused by the ignition of the ammonia gas is more unlikely to be taken away by the insulator 10. Accordingly, the ignition and combustion operation of the ammonia gas is more stabilized.

In addition, in the present embodiment, the protrusion portion 22 is provided at the peripheral edge portion of the center electrode 21 having a circular shape and has an annular shape. For this reason, a discharge can be generated in the space S between the protrusion portion 22 and the ground electrode 12 over the whole circumference of the center electrode 21. In addition, since the shape of the center electrode 21 is a circular shape, the center electrode 21 can be easily manufactured.

Figure 13:
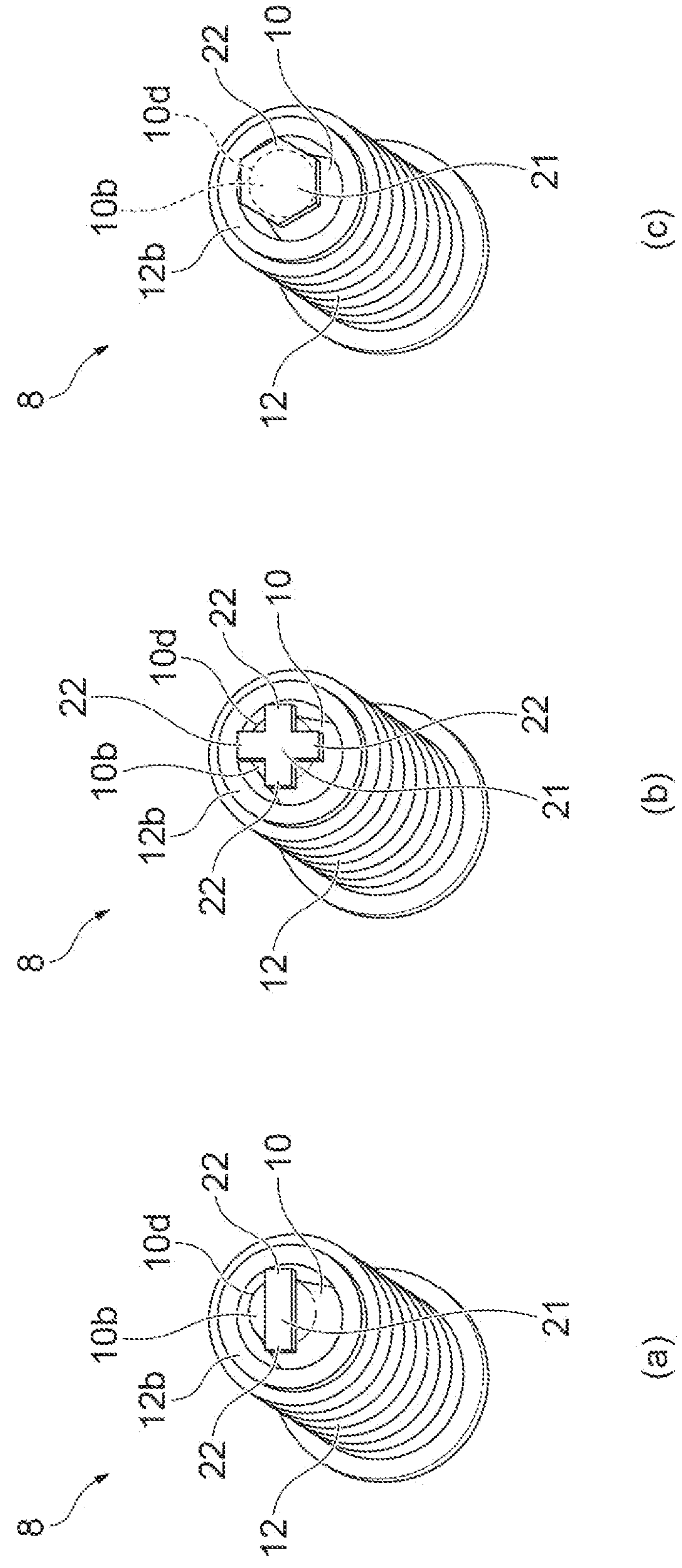
FIG. 13 is a schematic front view of an ignition plug including a modification example of a center electrode illustrated in FIG. 12.

FIG. 13 is a schematic front view of the ignition plug 8 including a modification example of the center electrode 21 illustrated in FIG. 12. In the ignition plug 8 illustrated in (a) in FIG. 13, the shape of the center electrode 21 is an oblong shape in a front view. Each of both end portions in a longitudinal direction of the center electrode 21 is provided with the protrusion portion 22 protruding in the radial direction of the insulator 10 with respect to the peripheral edge 10*d* of the tip surface 10*b* of the insulator 10.

In the ignition plug 8 illustrated in (b) in FIG. 13, the shape of the center electrode 21 is a cross shape in a front view. Each of end portions of the cross of the center electrode 21 is provided with the protrusion portion 22 protruding in the radial direction of the insulator 10 with respect to the peripheral edge 10*d* of the tip surface 10*b* of the insulator 10.

In the ignition plug 8 illustrated in (c) in FIG. 13, the shape of the center electrode 21 is a polygonal shape (here, a hexagonal shape) in a front view. The peripheral edge portion of the center electrode 21 is provided with the protrusion portion 22 having an angled annular shape (here, a hexagonal annular shape) and protruding in the radial direction of the insulator 10 with respect to the peripheral edge 10*d* of the tip surface 10*b* of the insulator 10.

In any one of (a) to (c) in FIGS. 13 to 13, when a high voltage is applied to the center electrode 21 of the ignition plug 8, a discharge is generated in the space S between the protrusion portion 22 of the center electrode 21 and the ground electrode 12, and the ammonia gas is ignited and combusted. Incidentally, the shape of the center electrode 21 is not limited to the shapes illustrated in FIG. 13.

Figure 14:
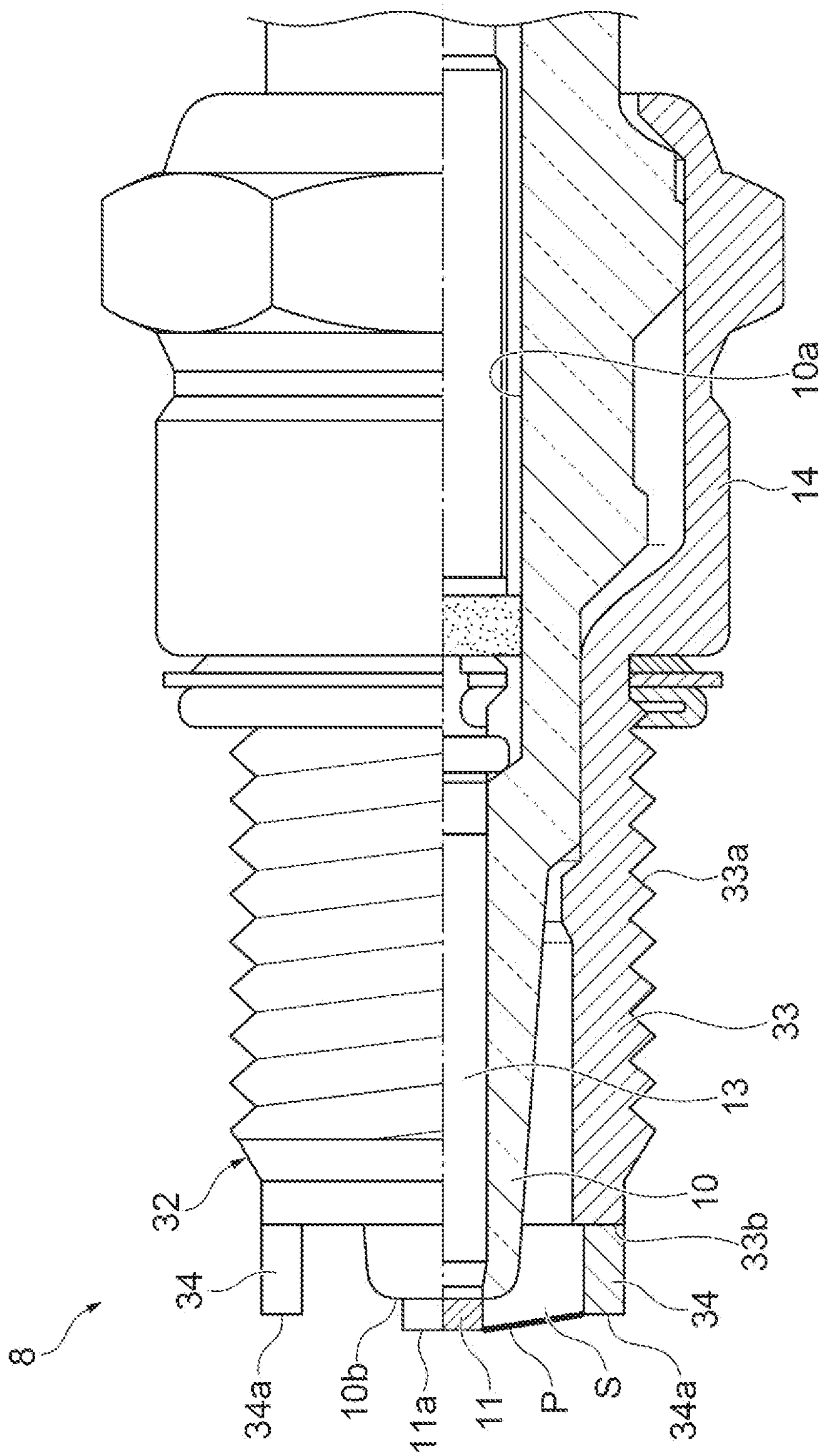
FIG. 14 is a side cut-away view illustrating an ignition plug in a combustor according to a fourth embodiment of the present disclosure.
Figure 15:
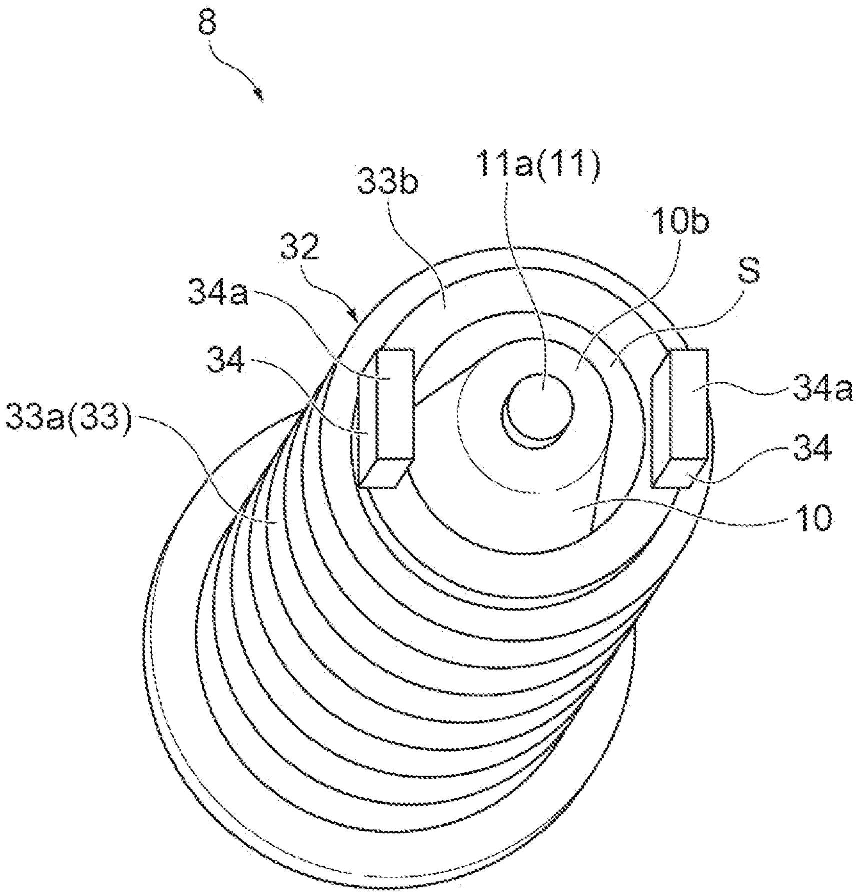
FIG. 15 is a schematic front view of the ignition plug illustrated in FIG. 14.

[Fourth Embodiment] FIG. 14 is a side cut-away view illustrating an ignition plug in a combustor according to a fourth embodiment of the present disclosure. FIG. 15 is a schematic front view of the ignition plug illustrated in FIG. 14. In FIGS. 14 and 15, in the combustor 1 of the present embodiment, the ignition plug 8 includes a ground electrode 32 instead of the ground electrode 12 in the second embodiment.

The ground electrode 32 includes an electrode main body 33 having a circular cylindrical shape and corresponding to the ground electrode 12 in the second embodiment, and two projections 34 each having a plate shape and being integrated with the electrode main body 33. A male screw portion 33*a* is formed in an outer peripheral surface of the electrode main body 33.

The projections 34 protrude from a tip surface 33*b* of the electrode main body 33. Namely, a tip portion of the ground electrode 32 is provided with the two projections 34 protruding to the one end side (gas outlet portion 6 side) of the housing 2. For example, the two projections 34 are disposed to face each other with the center electrode 11 interposed between. The tip surface 11*a* of the center electrode 11 is located on the one end side of the housing 2 with respect to tip surfaces 34*a* of the projections 34.

In the combustor 1 including the ignition plug 8, when the voltage supply unit 9 applies a high voltage to the center electrode 11 of the ignition plug 8 via the terminal metal fixture 15 and via the center pole 13, the discharge P is generated in the space S between the tip portion of the center electrode 11 and tip portions of the projections 34 of the ground electrode 32 in the ignition plug 8, and the ammonia gas is ignited and combusted.

In the present embodiment as described above, when a voltage is supplied to the center electrode 11, a discharge is generated in the space S between the center electrode 11 and the projections 34. Therefore, the discharge is generated in the space separated from the insulator 10, so that heat caused by the ignition of the ammonia gas is more unlikely to be taken away by the insulator 10. Accordingly, the ignition and combustion operation of the ammonia gas is more stabilized.

Figure 16:
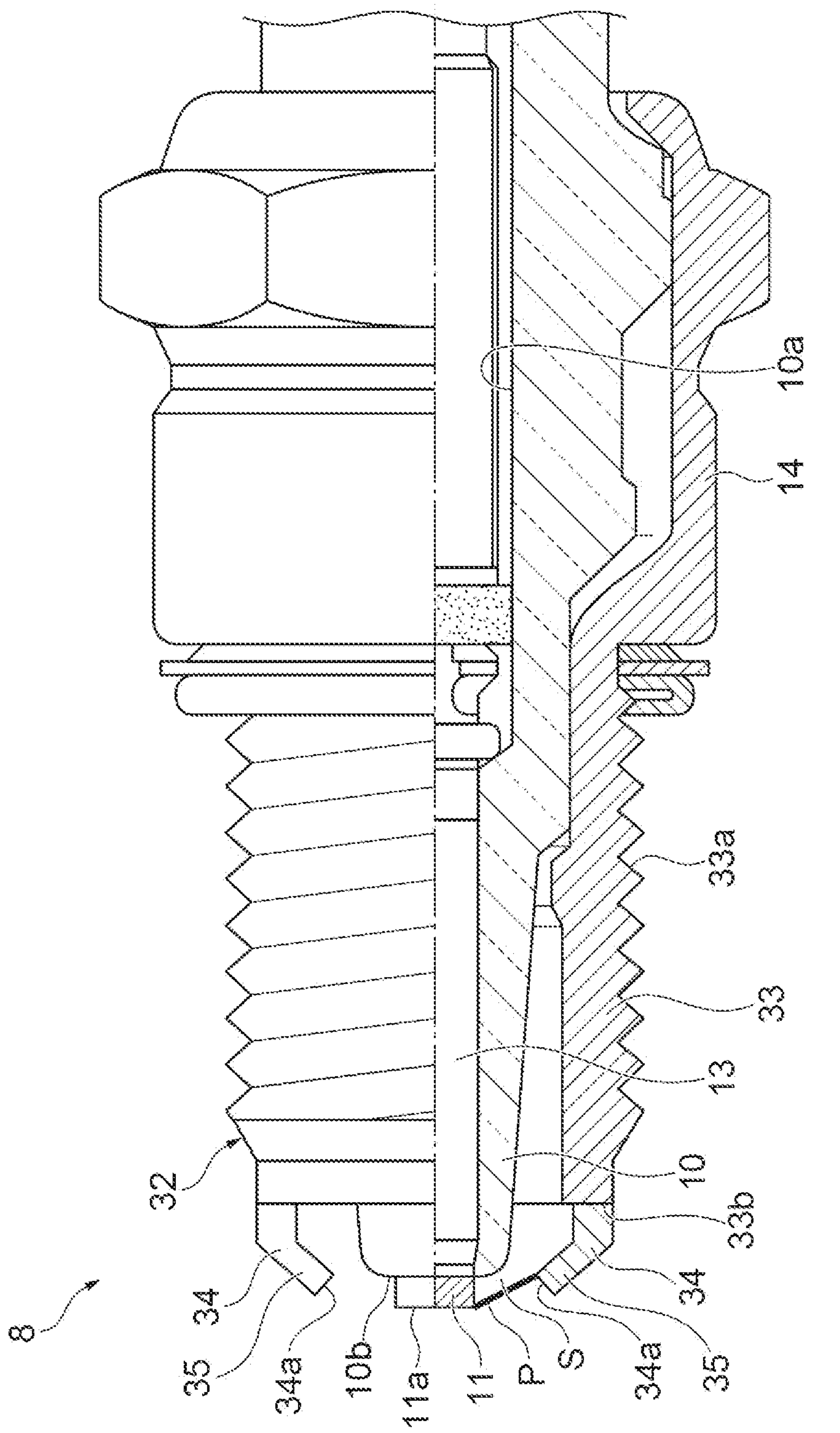
FIG. 16 is a side cut-away view of an ignition plug including a modification example of a ground electrode illustrated in FIG. 14.

FIG. 16 is a side cut-away view of the ignition plug 8 including a modification example of the ground electrode 32 illustrated in FIG. 15. In FIG. 16, bent portions 35 mutually bent at an obtuse angle to the center electrode 11 side are provided on tip sides of the projections 34 of the ground electrode 32. In this case, since the distance between the center electrode 11 and the projection 34 is short, the discharge P is easily generated.

Incidentally, in the present embodiment and the modification examples, the tip portion of the ground electrode 32 is provided with the two projections 34, but the number of the projections 34 is not particularly limited to 2 and may be 1 or 3 or more.

Figure 17:
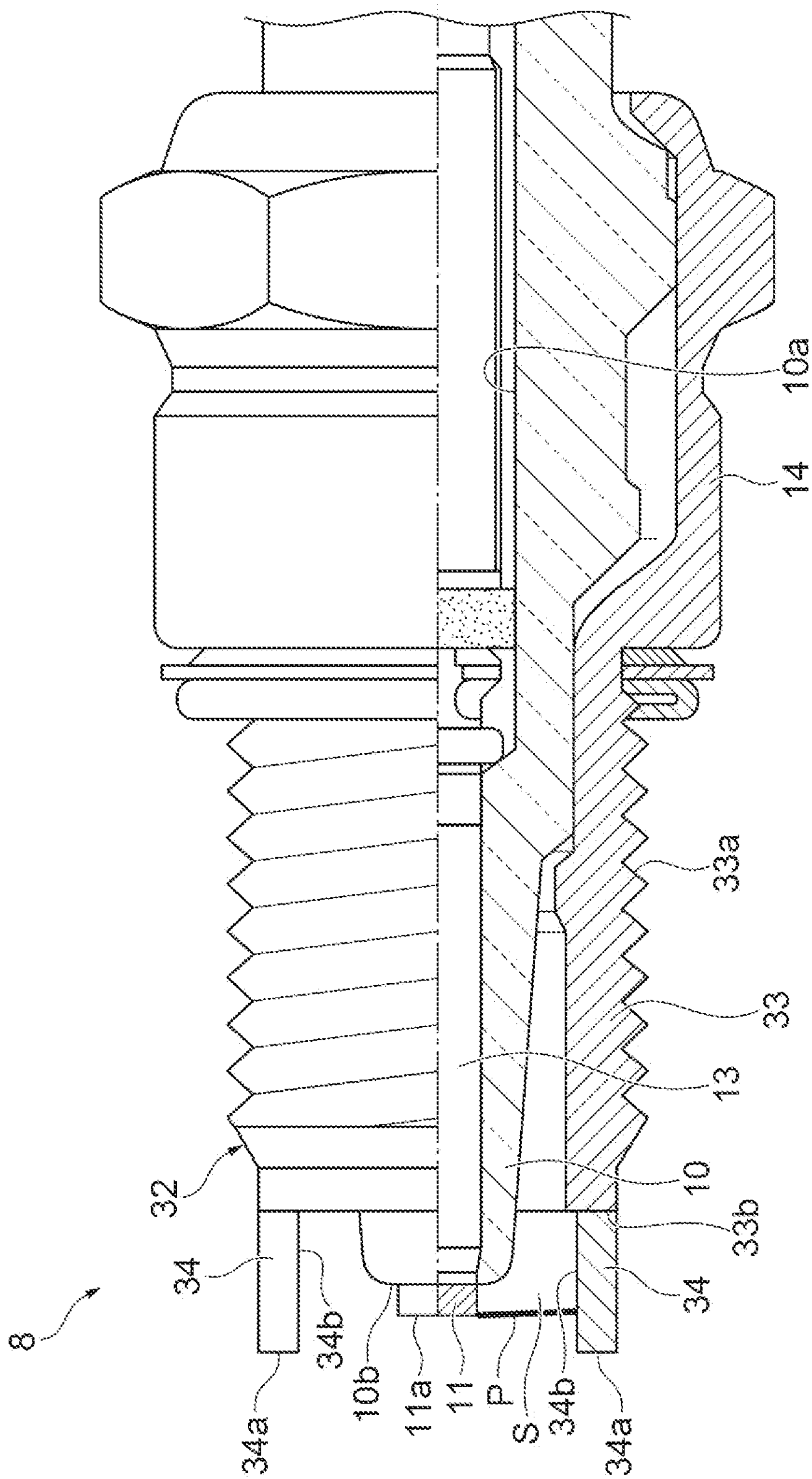
FIG. 17 is a side cut-away view illustrating an ignition plug in a combustor according to a fifth embodiment of the present disclosure.

[Fifth Embodiment] FIG. 17 is a side cut-away view illustrating an ignition plug in a combustor according to a fifth embodiment of the present disclosure. In FIG. 17, in the combustor 1 of the present embodiment, similarly to the fourth embodiment, the ignition plug 8 includes the ground electrode 32. The tip surface 34*a* of the projection 34 of the ground electrode 32 is located on the one end side (gas outlet portion 6 side) of the housing 2 with respect to the tip surface 11*a* of the center electrode 11.

In the combustor 1 including the ignition plug 8, when the voltage supply unit 9 applies a high voltage to the center electrode 11 of the ignition plug 8 via the terminal metal fixture 15 and via the center pole 13, the discharge P is generated in the space S between the tip portion of the center electrode 11 and side surfaces 34*b* on an inner side (center electrode 11 side) of the projections 34 in the ignition plug 8, and the ammonia gas is ignited and combusted.

In the present embodiment as described above, when a voltage is supplied to the center electrode 11, a discharge is generated in the space S between the center electrode 11 and the side surfaces 34*b* of the projections 34. Therefore, the discharge is generated in the space sufficiently separated from the insulator 10, so that heat caused by the ignition of the ammonia gas is more unlikely to be taken away by the insulator 10. Accordingly, the ignition and combustion operation of the ammonia gas is even more stabilized.

Figure 18:
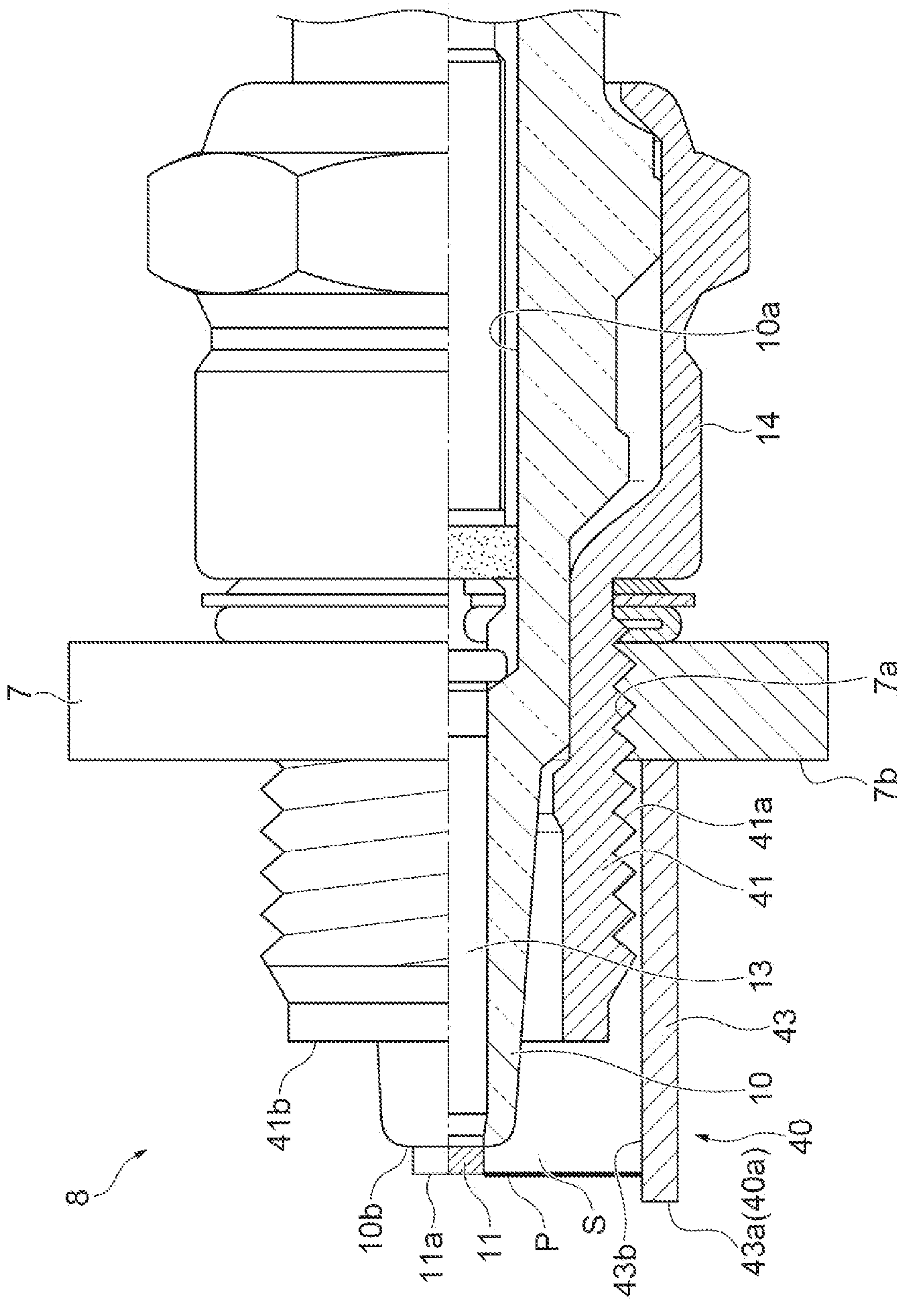
FIG. 18 is a side cut-away view illustrating an ignition plug in a combustor according to a sixth embodiment of the present disclosure.

[Sixth Embodiment] FIG. 18 is a side cut-away view illustrating an ignition plug in a combustor according to a sixth embodiment of the present disclosure. In FIG. 18, in the combustor 1 of the present embodiment, the ignition plug 8 includes a ground electrode 40 instead of the ground electrode 12 in the second embodiment. The ground electrode 40 is disposed outside the center electrode 11 in the radial direction of the metal shell 14 so as not to overlap the center electrode 11 in the axial direction of the metal shell 14.

The ground electrode 40 includes a circular cylindrical portion 41 corresponding to the ground electrode 12 in the second embodiment, the closed wall 7, and an erected portion 43 having a bar shape. The closed wall 7 forms an annular portion that is a part of the ground electrode 40. A male screw portion 41*a* to be screwed to the female screw portion 7*a* of the closed wall 7 is formed in an outer peripheral surface of the circular cylindrical portion 41.

The erected portion 43 is integrated with the closed wall 7. The erected portion 43 is provided on a tip surface 7*b* of the closed wall 7 to extend to the one end side (gas outlet portion 6 side) of the housing 2. The erected portion 43 is disposed outside the circular cylindrical portion 41 in a radial direction of the closed wall 7. Incidentally, the number of the erected portions 43 may be 1 or plural.

A tip surface 40*a* of the ground electrode 40 is located on the one end side of the housing 2 with respect to the tip surface 11*a* of the center electrode 11. The tip surface 40*a* of the ground electrode 40 corresponds to a tip surface 43*a* of the erected portion 43. A distance between the center electrode 11 and a peripheral surface 43*b* of the erected portion 43 is shorter than a distance between the center electrode 11 and a tip surface 41*b* of the circular cylindrical portion 41. The distance between the center electrode 11 and the peripheral surface 43*b* of the erected portion 43 is a distance along the radial direction of the metal shell 14.

In the combustor 1 including the ignition plug 8 described above, when the voltage supply unit 9 applies a high voltage to the center electrode 11 of the ignition plug 8 via the terminal metal fixture 15 and via the center pole 13, the discharge P is generated in the space S between the tip portion of the center electrode 11 and the peripheral surface 43*b* of the erected portion 43 in the ignition plug 8, and the ammonia gas is ignited and combusted.

In the present embodiment as described above, when a voltage is supplied to the center electrode 11, a discharge is generated in the space S between the center electrode 11 and the erected portion 43. Therefore, the discharge is generated in the space separated from the insulator 10, so that heat caused by the ignition of the ammonia gas is more unlikely to be taken away by the insulator 10. Accordingly, the ignition and combustion operation of the ammonia gas is more stabilized. In addition, the discharge energy can be reduced by reducing the heat capacity of the erected portion 43 compared to the circular cylindrical portion 41.

Figure 19:
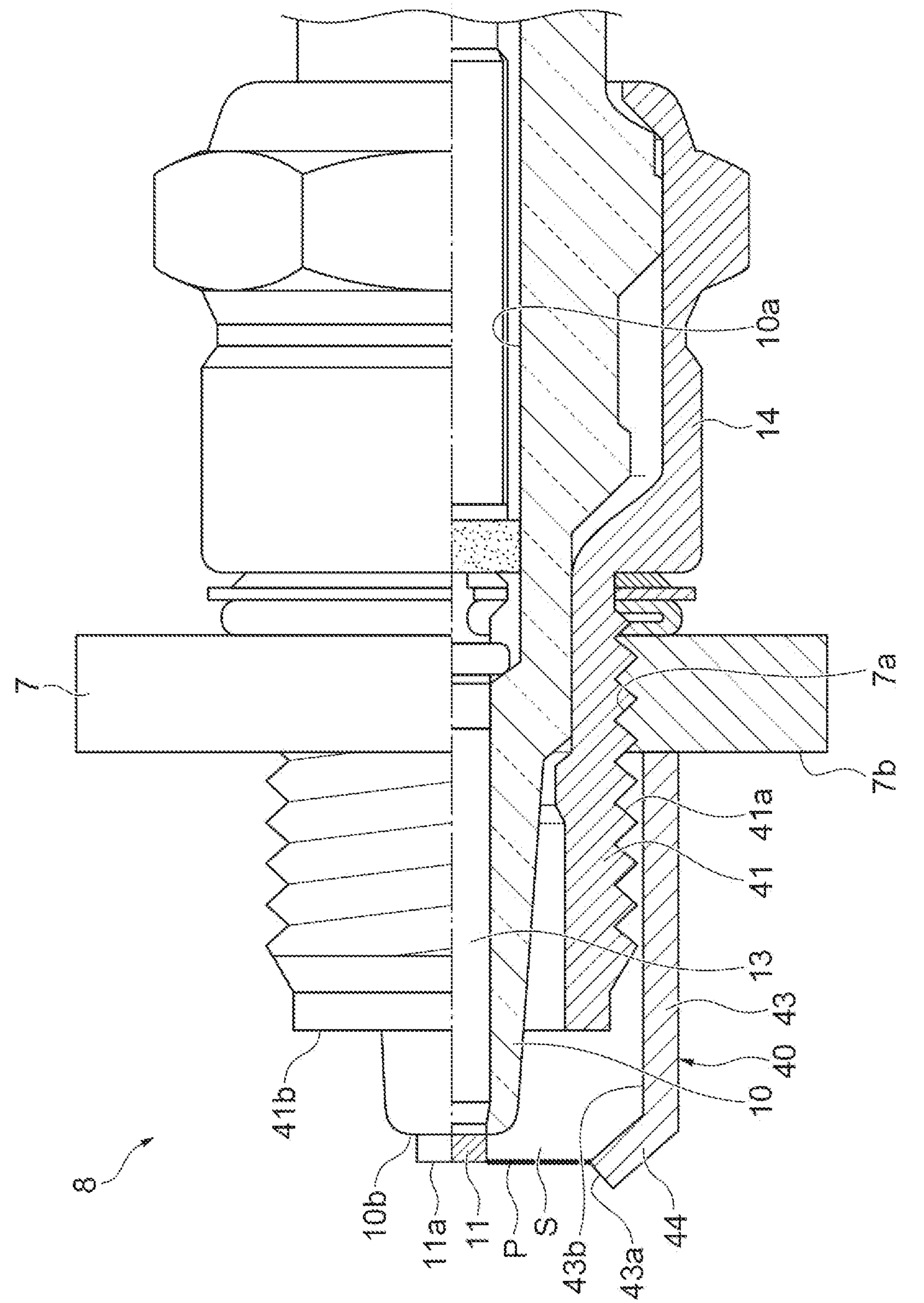
FIG. 19 is a side cut-away view of an ignition plug including a modification example of a ground electrode illustrated in FIG. 18.

FIG. 19 is a front view of the ignition plug 8 including a modification example of the ground electrode 40 illustrated in FIG. 18. In FIG. 19, in the present modification example, a tip side portion of the erected portion 43 of the ground electrode 40 is provided with a bent portion 44 bent at an obtuse angle to the center electrode 11 side. In this case, since the distance between the center electrode 11 and the erected portion 43 is short, the discharge is easily generated.

Figure 20:
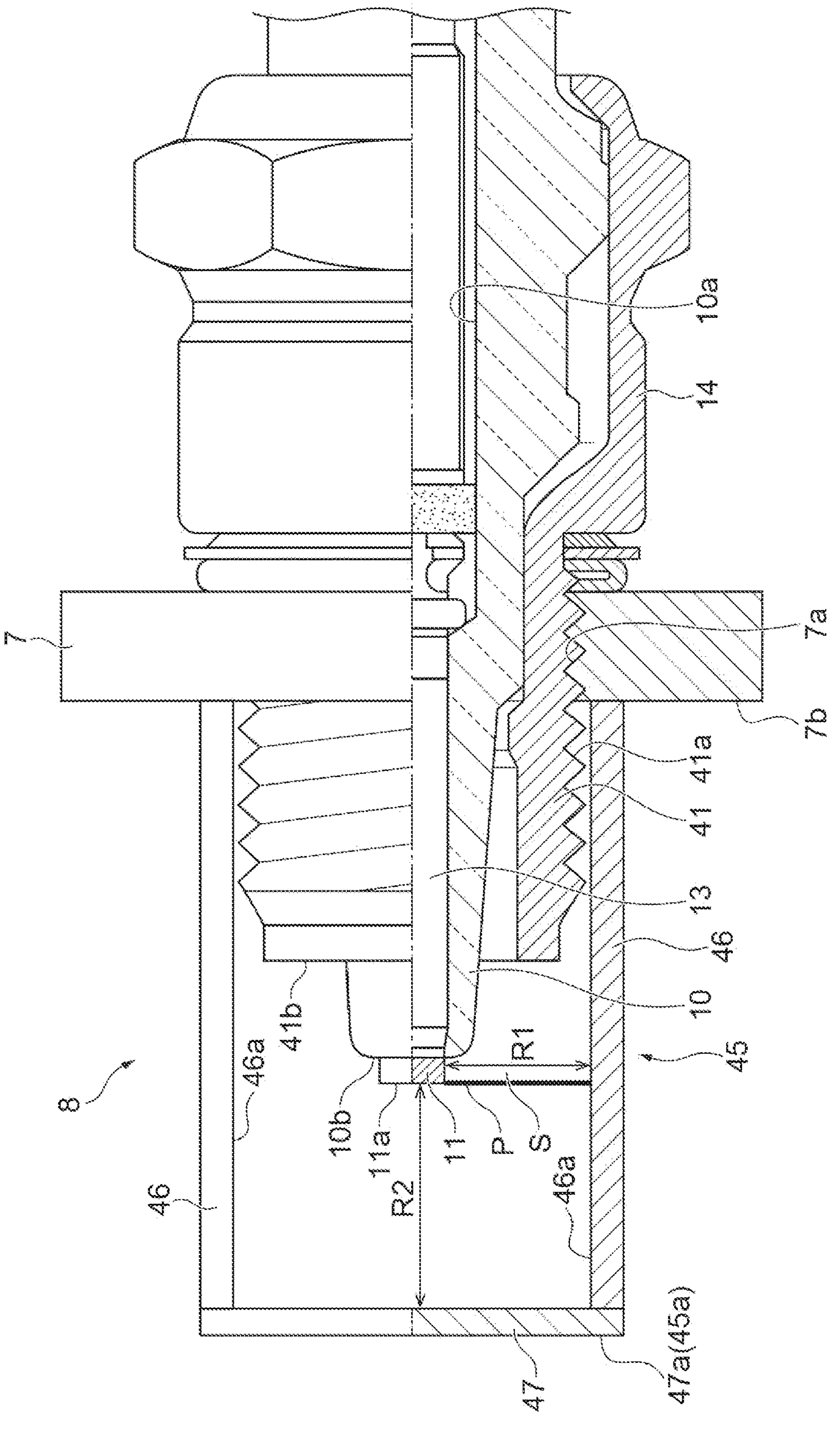
FIG. 20 is a side cut-away view illustrating an ignition plug in a combustor according to a seventh embodiment of the present disclosure.

[Seventh Embodiment] FIG. 20 is a side cut-away view illustrating an ignition plug in a combustor according to a seventh embodiment of the present disclosure. In FIG. 20, in the combustor 1 of the present embodiment, the ignition plug 8 includes a ground electrode 45 instead of the ground electrode 40 in the sixth embodiment.

The ground electrode 45 includes the circular cylindrical portion 41, the closed wall 7, a plurality (here, two) of erected portions 46 each having a bar shape, and a connection bar 47. The erected portions 46 are provided on the tip surface 7*b* of the closed wall 7 to extend to the one end side (gas outlet portion 6 side) of the housing 2. The connection bar 47 is a connection portion connecting tips of each of the erected portions 46. A tip surface 45*a* of the ground electrode 45 corresponds to a tip surface 47*a* of the connection bar 47.

A distance R1 between the center electrode 11 and the erected portion 46 is shorter than a distance R2 between the center electrode 11 and the connection bar 47. The distance R1 between the center electrode 11 and the erected portion 46 is a distance along the radial direction of the metal shell 14. The distance R2 between the center electrode 11 and the connection bar 47 is a distance along the axial direction of the metal shell 14.

In the combustor 1 including the ignition plug 8, when the voltage supply unit 9 applies a high voltage to the center electrode 11 of the ignition plug 8 via the terminal metal fixture 15 and via the center pole 13, the discharge P is generated in the space S between the tip portion of the center electrode 11 and peripheral surfaces 46*b* of the erected portions 46 in the ignition plug 8, and the ammonia gas is ignited and combusted.

In the present embodiment as described above, the tips of the plurality of erected portions 46 are connected by the connection bar 47, thereby leading to an increase in the strength of the erected portions 46. In addition, when a voltage is supplied to the center electrode 11, the discharge P is generated in the space S between the center electrode 11 and the erected portions 46, and the discharge P is not generated in a space between the center electrode 11 and the connection bar 47. In addition, the discharge energy can be reduced by reducing the heat capacity of the erected portion 46 and the connection bar 47 compared to the circular cylindrical portion 41.

Figure 21:
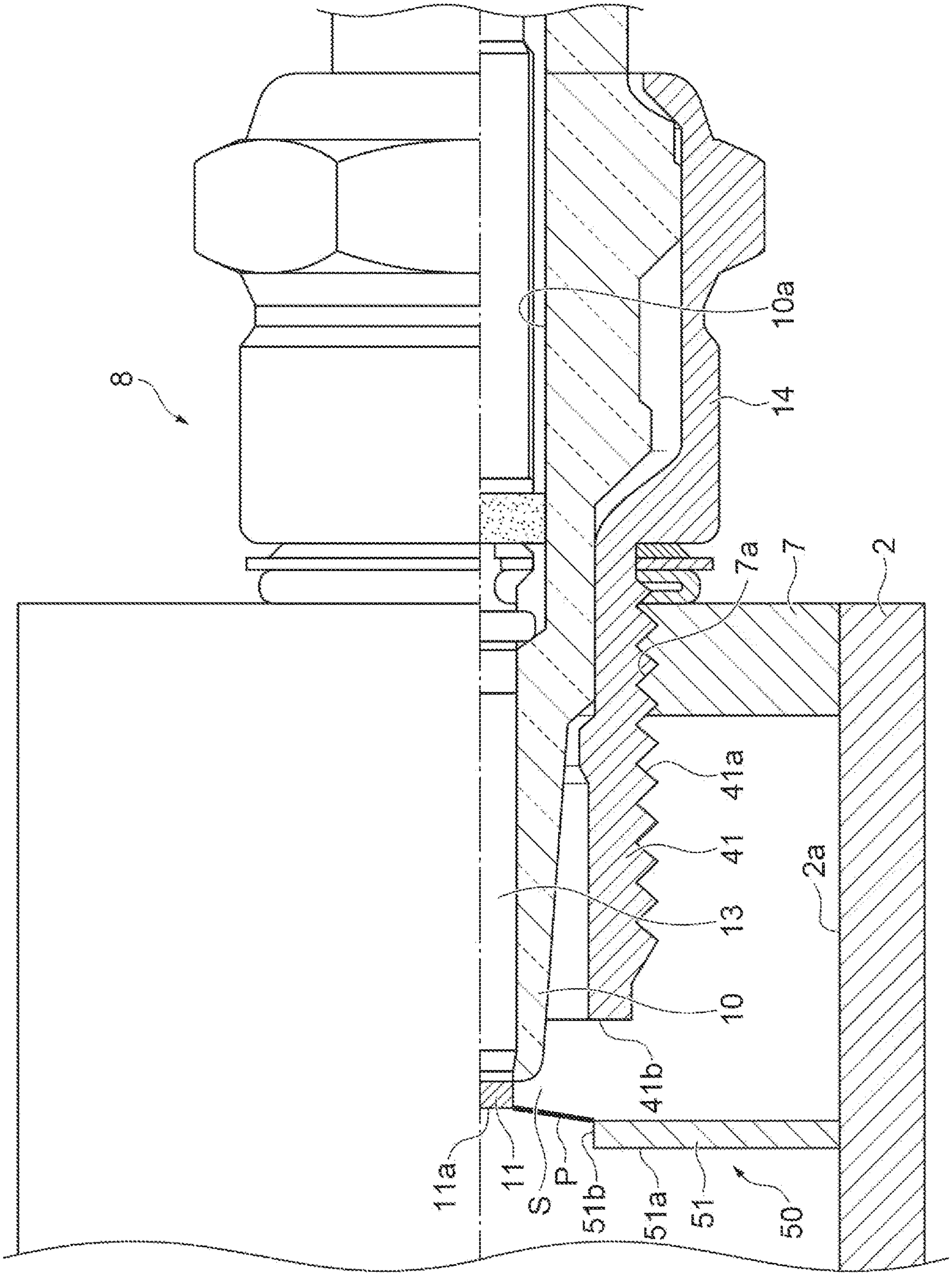
FIG. 21 is a side cut-away view illustrating an ignition plug in a combustor according to an eighth embodiment of the present disclosure.

[Eighth Embodiment] FIG. 21 is a side cut-away view illustrating an ignition plug in a combustor according to an eighth embodiment of the present disclosure. In FIG. 21, in the combustor 1 of the present embodiment, the ignition plug 8 includes a ground electrode 50 instead of the ground electrode 12 in the second embodiment. The ground electrode 50 is disposed outside the center electrode 11 in the radial direction of the metal shell 14 so as not to overlap the center electrode 11 in the axial direction of the metal shell 14.

The ground electrode 50 includes the circular cylindrical portion 41 that is the same as that of the sixth embodiment, and a protrusion 51 provided on the inner peripheral surface 2*a* of the housing 2. The protrusion 51 is provided on the inner peripheral surface 2*a* of the housing 2 to protrude inward in the radial direction of the housing 2 toward the center electrode 11. The protrusion 51 extends from the inner peripheral surface 2*a* of the housing 2 to the vicinity of the center electrode 11. The number of the protrusions 51 may be 1 or plural. The shape of the protrusion 51 is, for example, a rectangular shape, a fan shape, an annular shape, or the like when viewed in the axial direction of the metal shell 14.

A side surface 51*a* on the gas outlet portion 6 side of the protrusion 51 is located on the gas outlet portion 6 side (one end side of the housing 2) with respect to the tip surface 11*a* of the center electrode 11. A distance between the center electrode 11 and a tip surface 51*b* of the protrusion 51 is shorter than a distance between the center electrode 11 and the tip surface 41*b* of the circular cylindrical portion 41.

In the combustor 1 including the ignition plug 8, when the voltage supply unit 9 applies a high voltage to the center electrode 11 of the ignition plug 8 via the terminal metal fixture 15 and via the center pole 13, the discharge P is generated in the space S between the tip portion of the center electrode 11 and the tip surface 51*b* of the protrusion 51 in the ignition plug 8, and the ammonia gas is ignited and combusted.

In the present embodiment as described above, when a voltage is supplied to the center electrode 11, a discharge is generated in the space S between the center electrode 11 and the protrusion 51. Therefore, the discharge is generated in the space separated from the insulator 10, so that heat caused by the ignition of the ammonia gas is more unlikely to be taken away by the insulator 10. Accordingly, the ignition and combustion operation of the ammonia gas is more stabilized. In addition, the structure of the ground electrode 50 can be simplified. Further, the discharge energy can be reduced by reducing the heat capacity of the protrusion 51 compared to the circular cylindrical portion 41.

Several embodiments of the present disclosure have been described above, but the present disclosure is not limited to the above embodiments. For example, in the second and third embodiments, the tip surfaces 11*a* and 21*a* of the center electrodes 11 and 21 are located on the one end side (gas outlet portion 6 side) of the housing 2 with respect to the tip surface 12*b* of the ground electrode 12, but the present disclosure is not particularly limited to such a form. The tip surfaces 11*a* and 21*a* of the center electrodes 11 and 21 may be located to be flush with the tip surface 12*b* of the ground electrode 12 or may be located on the other end side (closed wall 7 side) of the housing 2 with respect to the tip surface 12*b* of the ground electrode 12.

In addition, in the sixth embodiment, the tip surface 40*a* of the ground electrode 40 is located on the one end side of the housing 2 with respect to the tip surface 11*a* of the center electrode 11, but the present disclosure is not particularly limited to such a form. The tip surface 40*a* of the ground electrode 40 may be located to be flush with the tip surface 11*a* of the center electrode 11 or may be located on the other end side of the housing 2 with respect to the tip surface 11*a* of the center electrode 11.

In addition, in the eighth embodiment, the side surface 51*a* on the gas outlet portion 6 side of the protrusion 51 in the ground electrode 50 is located on the gas outlet portion 6 side (one end side of the housing 2) with respect to the tip surface 11*a* of the center electrode 11, but the present disclosure is not particularly limited to such a form. The side surface 51*a* on the gas outlet portion 6 side of the protrusion 51 may be located to be flush with the tip surface 11*a* of the center electrode 11 or may be located on the other end side of the housing 2 with respect to the tip surface 11*a* of the center electrode 11.

In addition, in the sixth to eighth embodiments, each of the ground electrodes 40, 45, and 50 includes the circular cylindrical portion 41 corresponding to the ground electrode 12 in the first embodiment, but the circular cylindrical portion 41 may not be particularly provided.

In addition, in the above embodiments, the metal shell 14 has a circular cylindrical shape, but the shape of the metal shell 14 is not particularly limited to a circular cylindrical shape and may be a cylindrical shape. In this case, the cylindrical shape is not limited only to a perfect cylindrical shape and also includes a substantially cylindrical shape.

In addition, in the above embodiments, the ammonia gas introduction portions 3 introduce the ammonia gas into the housing 2 in the tangential direction of the inner peripheral surface 2*a* of the housing 2, and the air introduction portions 4 introduce the air into the housing 2 in the tangential direction of the inner peripheral surface 2*a* of the housing 2, but the present disclosure is not particularly limited to such a form. The ammonia gas introduction portions 3 may introduce the ammonia gas into the housing 2 so as to be offset from the tangential direction of the inner peripheral surface 2*a* of the housing 2 as long as the ammonia gas introduction portions 3 introduce the ammonia gas into the housing 2 to generate a tubular flow. The air introduction portions 4 may introduce the air into the housing 2 so as to be offset from the tangential direction of the inner peripheral surface 2*a* of the housing 2 as long as the air introduction portions 4 introduce the air into the housing 2 to generate a tubular flow.

In addition, in the above embodiments, the ammonia gas introduction portions 3 and the air introduction portions 4 separately introduce the ammonia gas and the air into the housing 2 to generate a tubular flow, but the present disclosure is not particularly limited to such a form, and at least one introduction portion that introduces a mixed gas of the ammonia gas and the air into the housing 2 to generate a tubular flow may be provided.

In addition, in the above embodiments, the ammonia gas is introduced as a fuel into the housing 2 to generate a tubular flow, but the fuel is not particularly limited to the ammonia gas, and may be a fuel gas such as hydrocarbon gas, methane gas, or city gas or may be a liquid fuel or the like that vaporizes at a relatively low temperature, such as liquid ammonia, kerosene, alcohol, or A-type heavy oil.

In addition, in the above embodiments, the air is introduced as an oxidizing gas into the housing 2 to generate a tubular flow, but the oxidizing gas is not particularly limited to the air and may be oxygen.

REFERENCE SIGNS LIST

100, 1: tubular flame burner (combustor), 20, 2: housing, 20*a*: open end, 20*c*, 2*a*: inner peripheral surface, 30, 3: ammonia gas introduction portion (introduction portion), 30*b*: rear end (end on closed wall side), 400, 4: air introduction portion (introduction portion), 400*b*: rear end (end on closed wall side), 500, 5: ignition unit, 60, 7: closed wall (annular portion), 70: discharge electrode terminal, 140: voltage supply unit, 110: insulating body, 8: ignition plug, 10: insulator, 10*b*: tip surface, 10*d*: peripheral edge, 11: center electrode, 11*a*: tip surface (tip), 12: ground electrode, 13: center pole, 14: metal shell, 21: center electrode, 21*a*: tip surface (tip), 22: protrusion portion, 22*a*: side end, 32: ground electrode, 34: projection, 34*a*: tip surface (tip), 40:

ground electrode, 43: erected portion, 45: ground electrode, 46: erected portion, 47: connection bar (connection portion), 50: ground electrode, 51: protrusion, S: space, D1 to D3: diameter, R1, R2: distance.

The invention claimed is:

1. A combustor comprising:
a housing having a cylindrical shape of which one end side is open and of which the other end side is closed;
at least one introduction portion that introduces a fuel and an oxidizing gas into the housing to generate a tubular flow; and
an ignition unit that ignites the fuel introduced into the housing,
wherein the ignition unit includes a discharge electrode and a ground electrode, and
a space that the fuel and the oxidizing gas reach is provided between the discharge electrode and the ground electrode,
wherein, a first end of the housing forms an open end of the housing in an axial direction of the housing, and a wall is provided at a second end of the housing that forms a closed end of the housing in the axial direction of the housing,
the housing is grounded to function as the ground electrode,
the ignition unit includes
a discharge electrode terminal, which is disposed at the wall of the closed end of the housing so as to extend inside of the housing, to function as the discharge electrode, and
a voltage supply unit that supplies a voltage to the discharge electrode terminal, to generate a discharge between a tip portion of the discharge electrode terminal and the housing to ignite the fuel,
the introduction portion is provided between the wall of the housing and the center portion of the housing in the axial direction of the housing on the outer peripheral surface of the housing having the cylindrical shape, and
the tip portion of the discharge electrode terminal of the ignition unit is positioned inside the housing between a rear end of the introduction portion and the wall of the closed end of the housing in the axial direction.

2. The combustor according to claim 1,
wherein the discharge electrode terminal is attached to the closed wall via an insulating body.

3. The combustor according to claim 2,
wherein the discharge electrode terminal is disposed at a radially center portion of the housing inside the housing.

4. A combustor comprising:
a housing having a cylindrical shape of which one end side is open and of which the other end side is closed;
at least one introduction portion that introduces a fuel and an oxidizing gas into the housing to generate a tubular flow; and
an ignition unit that ignites the fuel introduced into the housing,
wherein the ignition unit includes a discharge electrode and a ground electrode, and
a space that the fuel and the oxidizing gas reach is provided between the discharge electrode and the ground electrode,
wherein in the combustor that combusts the fuel mixed with the oxidizing gas, to generate combustion gas,
the fuel, the oxidizing gas, and the combustion gas flow in an axial direction of the housing,
the ignition unit includes an ignition plug disposed on the other end side of the housing, and ignites the fuel introduced into the housing, to generate the combustion gas including a tubular flame,
the ignition plug includes an insulator, a center electrode that is provided at a tip of a center pole supported by the insulator, to function as the discharge electrode, and the ground electrode integrated with a metal shell having a cylindrical shape and being disposed around the insulator,
the ignition unit ignites the fuel by supplying a voltage to the center electrode and thus generating a discharge in the space between the center electrode and the ground electrode,
the center electrode protrudes from a tip surface of the insulator, and
the ground electrode is disposed outside the center electrode in a radial direction of the metal shell so as not to overlap the center electrode in an axial direction of the metal shell,
wherein the ground electrode has a cylindrical shape and is integrated with the metal shell so as to be disposed around the insulator.

5. The combustor according to claim 4,
wherein a tip of the center electrode is located on the one end side of the housing with respect to the ground electrode.

6. The combustor according to claim 4,
wherein the center electrode includes a protrusion portion protruding in a radial direction of the ground electrode with respect to a peripheral edge of the tip surface of the insulator, and
a side end of the protrusion portion is located in a region outside the tip surface of the insulator in the radial direction of the ground electrode and inside the ground electrode in the radial direction of the ground electrode.

7. The combustor according to claim 6,
wherein the center electrode has a circular shape,
a diameter of the center electrode is larger than a diameter of the tip surface of the insulator and smaller than a diameter of the ground electrode, and
the protrusion portion is provided at a peripheral edge portion of the center electrode and has an annular shape.

8. The combustor according to claim 4,
wherein a tip portion of the ground electrode is provided with a projection protruding to the one end side of the housing.

9. The combustor according to claim 8,
wherein a tip of the projection is located on the one end side of the housing with respect to the center electrode.

10. A combustor comprising:
a housing having a cylindrical shape of which one end side is open and of which the other end side is closed;
at least one introduction portion that introduces a fuel and an oxidizing gas into the housing to generate a tubular flow; and
an ignition unit that ignites the fuel introduced into the housing,
wherein the ignition unit includes a discharge electrode and a ground electrode, and
a space that the fuel and the oxidizing gas reach is provided between the discharge electrode and the ground electrode,
wherein in the combustor that combusts the fuel mixed with the oxidizing gas, to generate combustion gas, the fuel, the oxidizing gas, and the combustion gas flow in an axial direction of the housing, the ignition unit includes an ignition plug disposed on the other end side of the housing, and ignites the fuel introduced into the housing, to generate the combustion gas including a tubular flame, the ignition plug includes an insulator, a center electrode that is provided at a tip of a center pole supported by the insulator, to function as the discharge electrode, and the ground electrode integrated with a metal shell having a cylindrical shape and being disposed around the insulator, the ignition unit ignites the fuel by supplying a voltage to the center electrode and thus generating a discharge in the space between the center electrode and the ground electrode, the center electrode protrudes from a tip surface of the insulator, and the ground electrode is disposed outside the center electrode in a radial direction of the metal shell so as not to overlap the center electrode in an axial direction of the metal shell, wherein the ground electrode includes an annular portion attached to the metal shell, and an erected portion provided on a tip surface of the annular portion to extend to the one end side of the housing.

11. The combustor according to claim 10, wherein a plurality of the erected portions are provided on the tip surface of the annular portion, the ground electrode further includes a connection portion connecting tips of the plurality of erected portions, a tip of the connection portion is located on the one end side of the housing with respect to the center electrode, and a distance between the center electrode and the erected portion is shorter than a distance between the center electrode and the connection portion.

12. The combustor according to claim 4, wherein the metal shell is fixed to the housing, and the ground electrode includes a protrusion provided on an inner peripheral surface of the housing to protrude inward in a radial direction of the housing toward the center electrode.

* * * * *